United States Patent
Manolakos et al.

(10) Patent No.: US 11,470,561 B2
(45) Date of Patent: Oct. 11, 2022

(54) FALLBACK PROCEDURES WHEN THE PATH LOSS OR SPATIAL TRANSMIT QUASI-COLLOCATION (QCL) REFERENCE FROM NEIGHBORING CELLS IS FAILING FOR SOUNDING REFERENCE SIGNALS (SRS) FOR POSITIONING

(71) Applicant: QUALCOMM Incorporated, San Diego, CA (US)

(72) Inventors: Alexandros Manolakos, Escondido, CA (US); Sony Akkarakaran, Poway, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/086,422

(22) Filed: Nov. 1, 2020

(65) Prior Publication Data
US 2021/0051597 A1    Feb. 18, 2021

Related U.S. Application Data

(62) Division of application No. 16/876,851, filed on May 18, 2020, now Pat. No. 10,856,236.
(Continued)

(51) Int. Cl.
*H04W 52/14* (2009.01)
*H04B 17/309* (2015.01)

(52) U.S. Cl.
CPC ........ *H04W 52/146* (2013.01); *H04B 17/309* (2015.01)

(58) Field of Classification Search
CPC . H04W 52/146; H04W 52/42; H04W 52/242; H04W 52/325; H04W 64/00;
(Continued)

(56) References Cited

U.S. PATENT DOCUMENTS 9,681,482 B2    6/2017 Yang et al.
10,856,236 B1   12/2020 Manolakos et al.
(Continued)

FOREIGN PATENT DOCUMENTS

CN    107889209 A    4/2018
WO    2018203728 A1  11/2018

OTHER PUBLICATIONS

International Search Report and Written Opinion—PCT/US2020/033537—ISA/EPO—dated Sep. 10, 2020.
(Continued)

*Primary Examiner* — Shaima Q Aminzay
(74) *Attorney, Agent, or Firm* — Qualcomm Incorporated

(57) ABSTRACT

Disclosed are techniques for wireless communication. In an aspect, a UE receives a positioning configuration, the positioning configuration including at least an identifier of a first downlink reference signal from a neighboring cell to be used for estimating a downlink path loss or determining an uplink spatial transmit beam, determines that a first downlink reference signal received from the neighboring cell cannot be used for estimating the downlink path loss or determining the uplink spatial transmit beam, in response to the determination, estimating the downlink path loss or determining the uplink spatial transmit beam based on a second downlink reference signal received from the neighboring cell or a serving cell, and transmits an uplink reference signal for positioning based on the estimated downlink path loss, the determined uplink spatial transmit beam, or a combination thereof.

8 Claims, 17 Drawing Sheets

Related U.S. Application Data

(60) Provisional application No. 62/850,503, filed on May 20, 2019.

(58) Field of Classification Search
CPC ............. H04W 16/28; H04W 36/0061; H04W 52/243; H04W 52/244; H04B 17/309; H04B 17/24; G01S 5/0226; G01S 5/0205
USPC ........................................................ 455/522
See application file for complete search history.

(56) References Cited

U.S. PATENT DOCUMENTS

| | | |
|---|---|---|
| 2014/0321406 A1 | 10/2014 | Marinier et al. |
| 2019/0037525 A1 | 1/2019 | Liu et al. |
| 2019/0116605 A1 | 4/2019 | Luo et al. |
| 2019/0223117 A1 | 7/2019 | Chai et al. |
| 2020/0221405 A1 | 7/2020 | Zarifi |
| 2021/0007060 A1* | 1/2021 | Chen .................. H04L 25/0226 |

OTHER PUBLICATIONS

Nokia., et al., "Views on Physical Layer Procedures for NR Positioning", 3GPP Draft, 3GPP TSG RAN WG1 #97, {1-1906661 PHY Procedures For NR Positioning, 3rd Generation Partnership Project (3GPP), Mobile Competence Centre, 650, Route Des Lucioles, F-06921 Sophia-Antipolis Cedex, FR, vol. RAN WG1, No. Reno, Nevada; May 13, 2019-May 17, 2019, May 3, 2019 (May 3, 2019), XP051708696, 6 Pgs, Retrieved from Internet: URL:http://www.3gpp.org/ftp/tsg%5Fran/WG1%5FRL1/TSGR1%5F97/DOCS/R1%2D1906661%2Ezip [retrieved May 3, 2019],Proposal 6, Proposal 7.

\* cited by examiner

FALLBACK PROCEDURES WHEN THE PATH LOSS OR SPATIAL TRANSMIT QUASI-COLLOCATION (QCL) REFERENCE FROM NEIGHBORING CELLS IS FAILING FOR SOUNDING REFERENCE SIGNALS (SRS) FOR POSITIONING

CROSS-REFERENCE TO RELATED APPLICATIONS

The present application for patent is a divisional application of U.S. patent application Ser. No. 16/876,851, entitled "FALLBACK PROCEDURES WHEN THE PATH LOSS OR SPATIAL TRANSMIT QUASI-COLLOCATION (QCL) REFERENCE FROM NEIGHBORING CELLS IS FAILING FOR SOUNDING REFERENCE SIGNALS (SRS) FOR POSITIONING," filed May 18, 2020, which claims the benefit of U.S. Provisional Application No. 62/850,503, entitled "REPORTING OF INFORMATION RELATED TO SOUNDING REFERENCE SIGNALS (SRS) TIMING ADJUSTMENTS," filed May 20, 2019, each assigned to the assignee hereof, and expressly incorporated herein by reference in its entirety.

BACKGROUND OF THE DISCLOSURE

1. Field of the Disclosure

Aspects of the disclosure relate generally to telecommunications, and more particularly to the reporting of information related to uplink reference signal timing adjustments for enhanced uplink reference signal processing.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

To support position estimations in terrestrial wireless networks, a mobile device can be configured to measure and report the observed time difference of arrival (OTDOA) or reference signal timing difference (RSTD) between reference signals received from two or more network nodes (e.g., different base stations or different transmission points (e.g., antennas) belonging to the same base station).

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving a positioning configuration, the positioning configuration including at least an identifier of a first downlink reference signal from a neighboring cell to be used for estimating a downlink path loss or determining an uplink spatial transmit beam, determining that the first downlink reference signal received from the neighboring cell cannot be used for estimating the downlink path loss or determining the uplink spatial transmit beam, in response to the determination, estimating the downlink path loss or determining the uplink spatial transmit beam based on a second downlink reference signal received from the neighboring cell or a serving cell, and transmitting an uplink reference signal for positioning based on the estimated downlink path loss, the determined uplink spatial transmit beam, or a combination thereof.

In an aspect, a method of wireless communication performed by a location server includes configuring a UE to receive at least a first downlink reference signal from a neighboring cell to be used to estimate a downlink path loss or determine an uplink spatial transmit beam, receiving, from the UE, a report indicating a signal quality of the first downlink reference signal, and based on the signal quality of the first downlink reference signal being below a threshold, configuring the UE to receive at least a second downlink reference signal from the neighboring cell or a serving cell to be used to estimate the downlink path loss or determine the uplink spatial transmit beam.

In an aspect, a method of wireless communication performed by a UE includes receiving, from a network node, a configuration to use at least a first downlink reference signal from a neighboring cell to estimate a downlink path loss or determine an uplink spatial transmit beam, sending, to the network node, a report indicating a signal quality of the first downlink reference signal, and based on the signal quality of the first downlink reference signal being below a threshold, receiving, from the network node, a configuration to use at least a second downlink reference signal from the neighboring cell or a serving cell to estimate the downlink path loss or determine the uplink spatial transmit beam.

In an aspect, a UE includes a memory, at least one transceiver, and at least one processor communicatively coupled to the memory and the at least one transceiver, the at least one processor configured to: receive, via the at least one transceiver, a positioning configuration, the positioning configuration including at least an identifier of a first downlink reference signal from a neighboring cell to be used for estimating a downlink path loss or determining an uplink spatial transmit beam, determine that the first downlink reference signal received from the neighboring cell cannot be used to estimate the downlink path loss or determine the uplink spatial transmit beam, in response to the determination, estimate the downlink path loss or determining the uplink spatial transmit beam based on a second downlink reference signal received from the neighboring cell or a serving cell, and cause the at least one transceiver to transmit an uplink reference signal for positioning based on the estimated downlink path loss, the determined uplink spatial transmit beam, or a combination thereof.

In an aspect, a location server includes a memory, at least one network interface, and at least one processor communicatively coupled to the memory and the at least one network interface, the at least one processor configured to: configure a UE to receive at least a first downlink reference signal from a neighboring cell to be used to estimate a downlink path loss or determine an uplink spatial transmit beam, receive, from the UE, a report indicating a signal quality of the first downlink reference signal, and configure the UE, based on the signal quality of the first downlink reference signal being below a threshold, to receive at least a second downlink reference signal from the neighboring cell or a serving cell to be used to estimate the downlink path loss or determine the uplink spatial transmit beam.

In an aspect, a UE includes a memory, at least one transceiver, and at least one processor communicatively coupled to the memory and the at least one transceiver, the at least one processor configured to: receive, from a network node, a configuration to use at least a first downlink reference signal from a neighboring cell to estimate a downlink path loss or determine an uplink spatial transmit beam, send, to the network node, a report indicating a signal quality of the first downlink reference signal, and receive, from the network node, based on the signal quality of the first downlink reference signal being below a threshold, a configuration to use at least a second downlink reference signal from the neighboring cell or a serving cell to estimate the downlink path loss or determine the uplink spatial transmit beam.

In an aspect, a UE includes means for receiving a positioning configuration, the positioning configuration including at least an identifier of a first downlink reference signal from a neighboring cell to be used for estimating a downlink path loss or determining an uplink spatial transmit beam, means for determining that the first downlink reference signal received from the neighboring cell cannot be used to estimate the downlink path loss or determine the uplink spatial transmit beam, in response to the determination, means for estimating the downlink path loss or determining the uplink spatial transmit beam based on a second downlink reference signal received from the neighboring cell or a serving cell, and means for transmitting an uplink reference signal for positioning based on the estimated downlink path loss, the determined uplink spatial transmit beam, or a combination thereof.

In an aspect, a location server includes means for configuring a UE to receive at least a first downlink reference signal from a neighboring cell to be used to estimate a downlink path loss or determine an uplink spatial transmit beam, means for receiving, from the UE, a report indicating a signal quality of the first downlink reference signal, and based on the signal quality of the first downlink reference signal being below a threshold, means for configuring the UE to receive at least a second downlink reference signal from the neighboring cell or a serving cell to be used to estimate the downlink path loss or determine the uplink spatial transmit beam.

In an aspect, a UE includes means for receiving, from a network node, a configuration to use at least a first downlink reference signal from a neighboring cell to estimate a downlink path loss or determine an uplink spatial transmit beam, means for sending, to the network node, a report indicating a signal quality of the first downlink reference signal, and means for receiving, from the network node, based on the signal quality of the first downlink reference signal being below a threshold, a configuration to use at least a second downlink reference signal from the neighboring cell or a serving cell to estimate the downlink path loss or determine the uplink spatial transmit beam.

In an aspect, a non-transitory computer-readable medium storing computer-executable instructions includes computer-executable instructions comprising at least one instruction instructing a UE to receive a positioning configuration, the positioning configuration including at least an identifier of a first downlink reference signal from a neighboring cell to be used for estimating a downlink path loss or determining an uplink spatial transmit beam, at least one instruction instructing the UE to determine that the first downlink reference signal received from the neighboring cell cannot be used to estimate the downlink path loss or determine the uplink spatial transmit beam, at least one instruction instructing the UE to estimate, in response to the determination, the downlink path loss or determining the uplink spatial transmit beam based on a second downlink reference signal received from the neighboring cell or a serving cell, and at least one instruction instructing the UE to transmit an uplink reference signal for positioning based on the estimated downlink path loss, the determined uplink spatial transmit beam, or a combination thereof.

In an aspect, a non-transitory computer-readable medium storing computer-executable instructions includes computer-executable instructions comprising at least one instruction instructing a location server to configure a UE to receive at least a first downlink reference signal from a neighboring cell to be used to estimate a downlink path loss or determine an uplink spatial transmit beam, at least one instruction instructing the location server to receive, from the UE, a report indicating a signal quality of the first downlink reference signal, and at least one instruction instructing the location server to configure, based on the signal quality of the first downlink reference signal being below a threshold, the UE to receive at least a second downlink reference signal from the neighboring cell or a serving cell to be used to estimate the downlink path loss or determine the uplink spatial transmit beam.

In an aspect, a non-transitory computer-readable medium storing computer-executable instructions includes computer-executable instructions comprising at least one instruction instructing a UE to receive, from a network node, a configuration to use at least a first downlink reference signal from a neighboring cell to estimate a downlink path loss or determine an uplink spatial transmit beam, at least one instruction instructing the UE to send, to the network node, a report indicating a signal quality of the first downlink reference signal, and at least one instruction instructing the UE to receive, from the network node, based on the signal quality of the first downlink reference signal being below a threshold, a configuration to use at least a second downlink reference signal from the neighboring cell or a serving cell to estimate the downlink path loss or determine the uplink spatial transmit beam.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
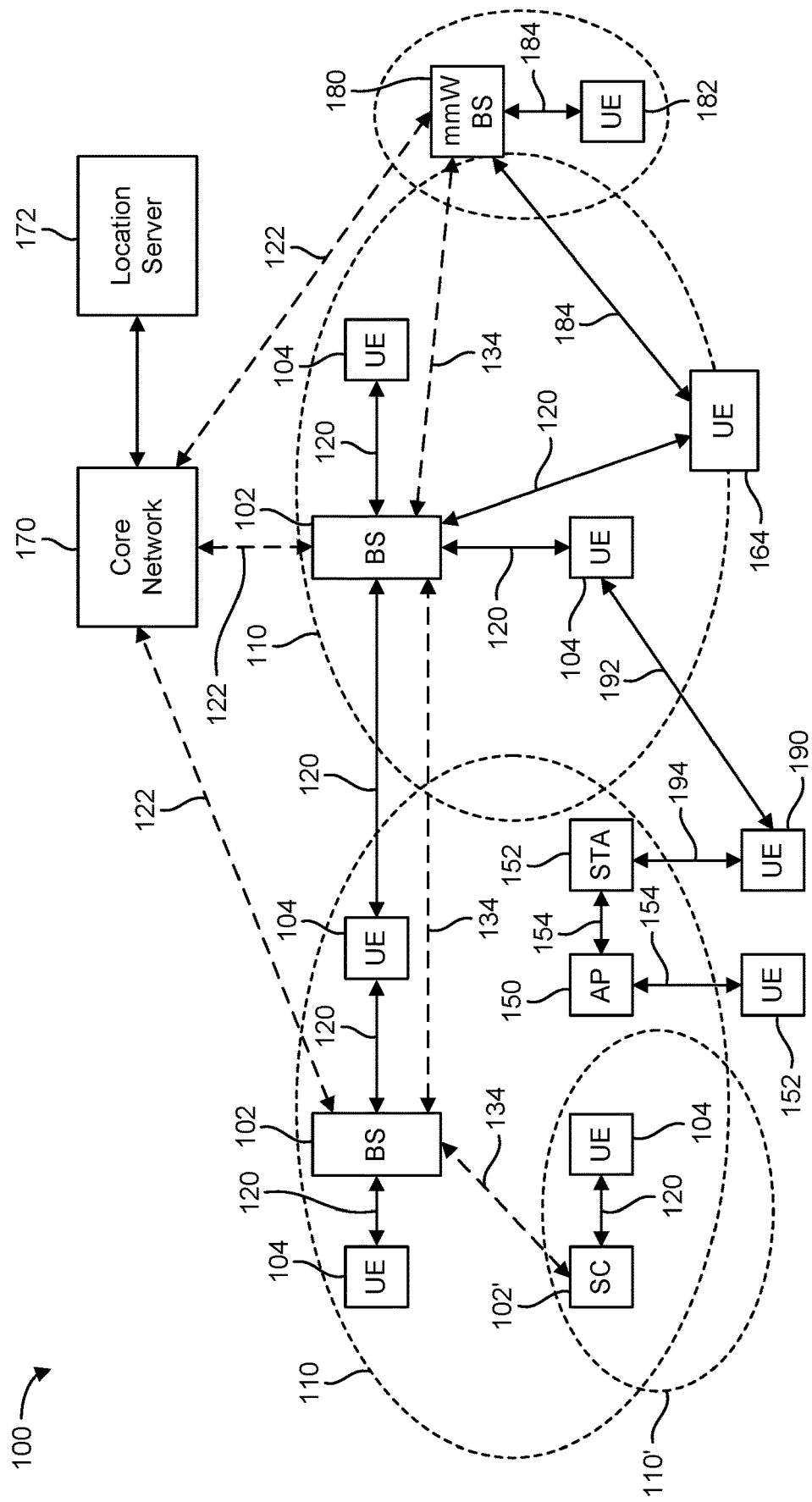
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station.

Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference signals the UE is measuring. Because a TRP is the point from which a base station transmits and receives wireless signals, as used herein, references to transmission from or reception at a base station are to be understood as referring to a particular TRP of the base station.

A radio frequency (RF) signal comprises an electromagnetic wave of a given frequency that transports information through the space between a transmitter and a receiver. As used herein, a transmitter may transmit a single RF signal or multiple RF signals to a receiver. However, the receiver may receive multiple RF signals corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations 102 may include eNBs where the wireless communications system 100 corresponds to an LTE network, or gNBs where the wireless communications system 100 corresponds to an NR network, or a combination of both, and the small cell base stations 102' may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for UL).

The wireless communications system 100 may further include a wireless local area network (WLAN) access point (AP) 150 in communication with one or more WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have a high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference signal on a second beam can be derived from information about a source reference signal on a source beam. Thus, if the source reference signal is QCL Type A, the receiver can use the source reference signal to estimate the Doppler shift, Doppler spread, average delay, and delay spread of a second reference signal transmitted on the same channel. If the source reference signal is QCL Type B, the receiver can use the source reference signal to estimate the Doppler shift and Doppler spread of a second reference signal transmitted on the same channel. If the source reference signal is QCL Type C, the receiver can use the source reference signal to estimate the Doppler shift and average delay of a second reference signal transmitted on the same channel. If the source reference signal is QCL Type D, the receiver can use the source reference signal to estimate the spatial receive parameter of a second reference signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
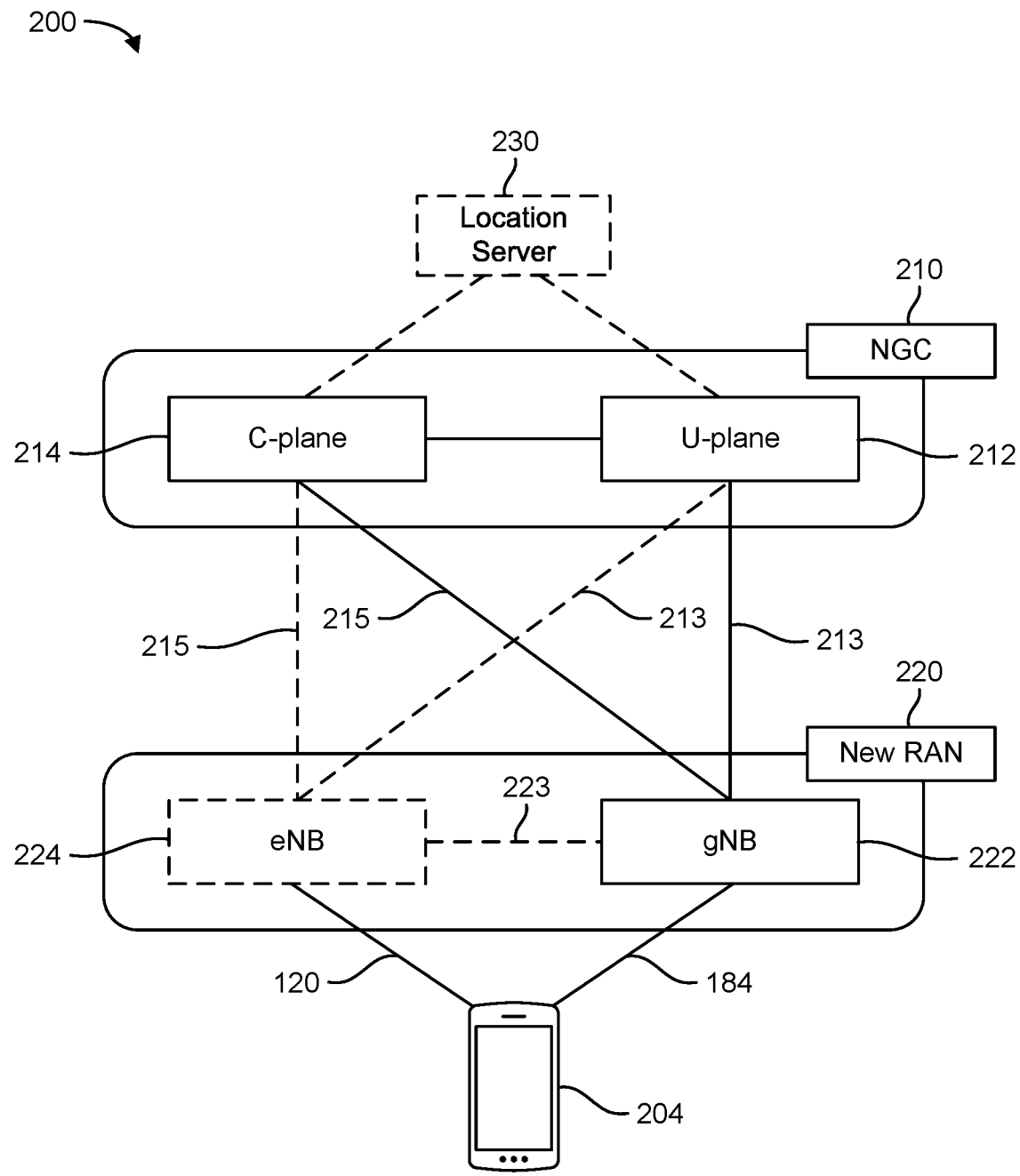
FIGS. 2A and 2B illustrate exemplary wireless network structures, according to various aspects of the disclosure.

According to various aspects, FIG. 2A illustrates an exemplary wireless network structure 200. For example, an NGC 210 (also referred to as a "5GC") can be viewed functionally as control plane functions (C-plane) 214 (e.g., UE registration, authentication, network access, gateway selection, etc.) and user plane functions (U-plane) 212 (e.g., UE gateway function, access to data networks, IP routing, etc.), which operate cooperatively to form the core network. User plane interface (NG-U) 213 and control plane interface (NG-C) 215 connect the gNB 222 to the NGC 210 and specifically to the user plane functions 212 and control plane functions 214, respectively. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
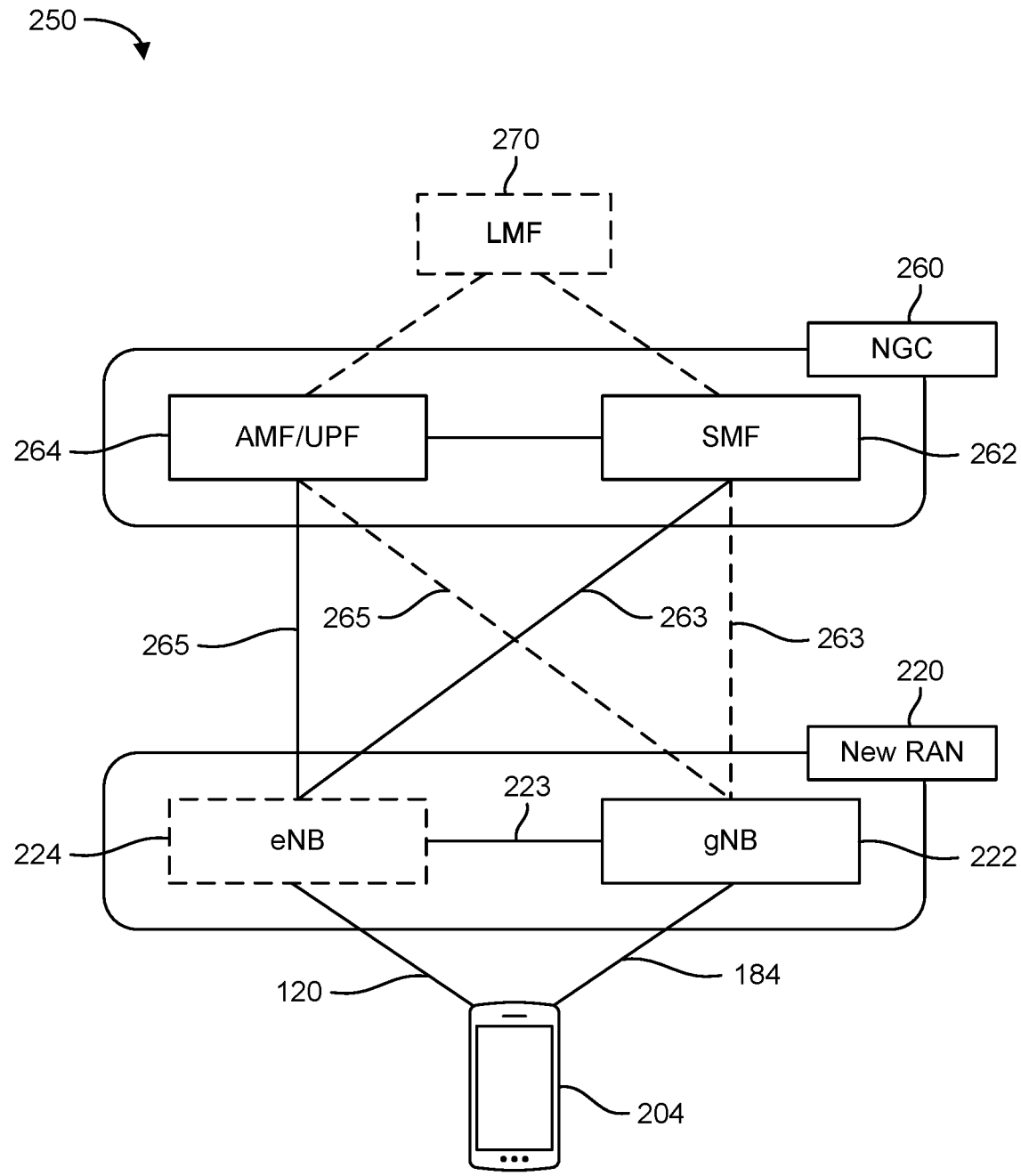

According to various aspects, FIG. 2B illustrates another exemplary wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), uplink traffic verification (service data flow (SDF) to QoS flow mapping), transport level packet marking in the uplink and DL, downlink packet buffering and downlink data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
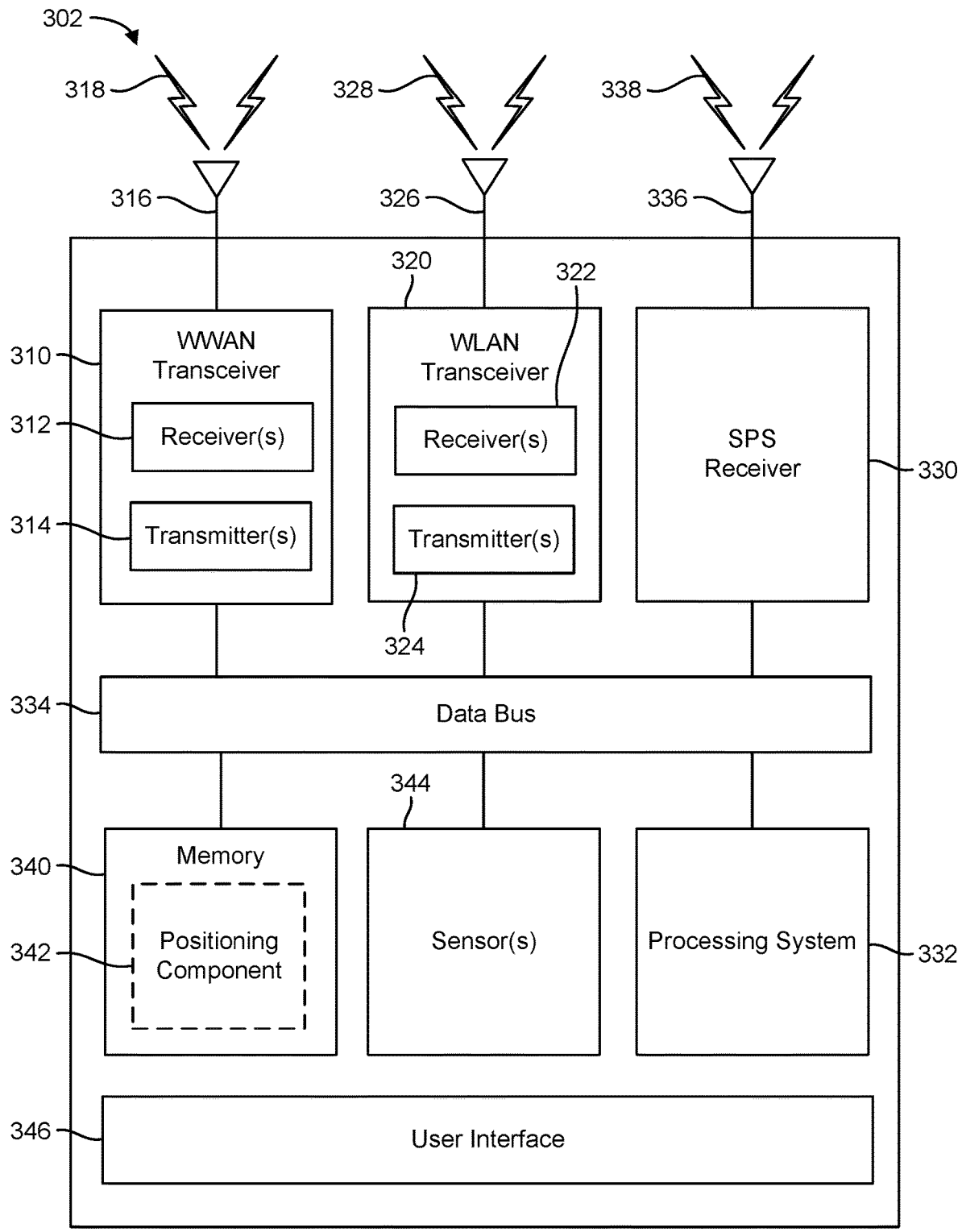
FIGS. 3A to 3C are simplified block diagrams of several exemplary aspects of components that may be employed in wireless communication nodes and configured to support communication, according to various aspects of the disclosure.
Figure 3B:
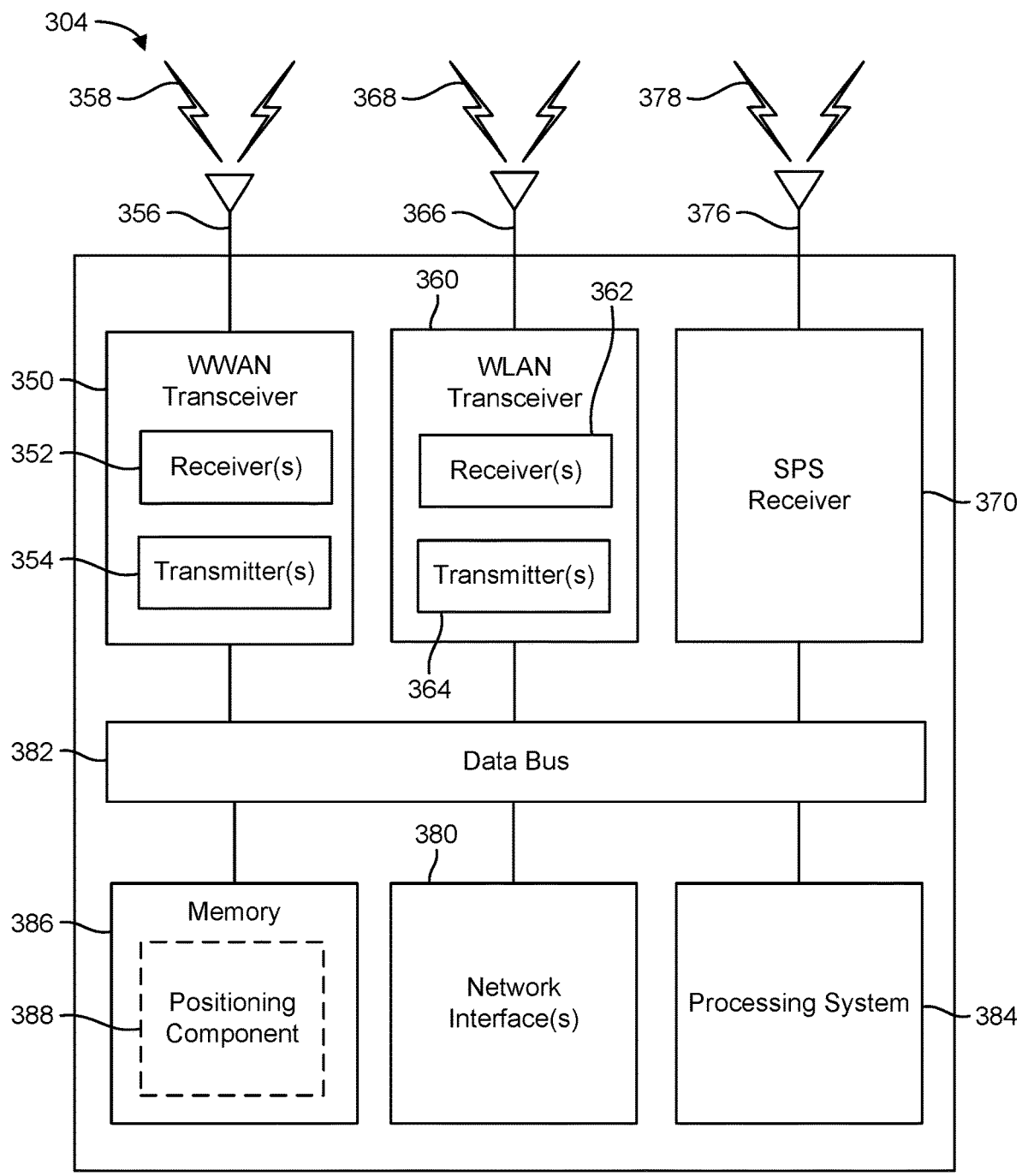
Figure 3C:
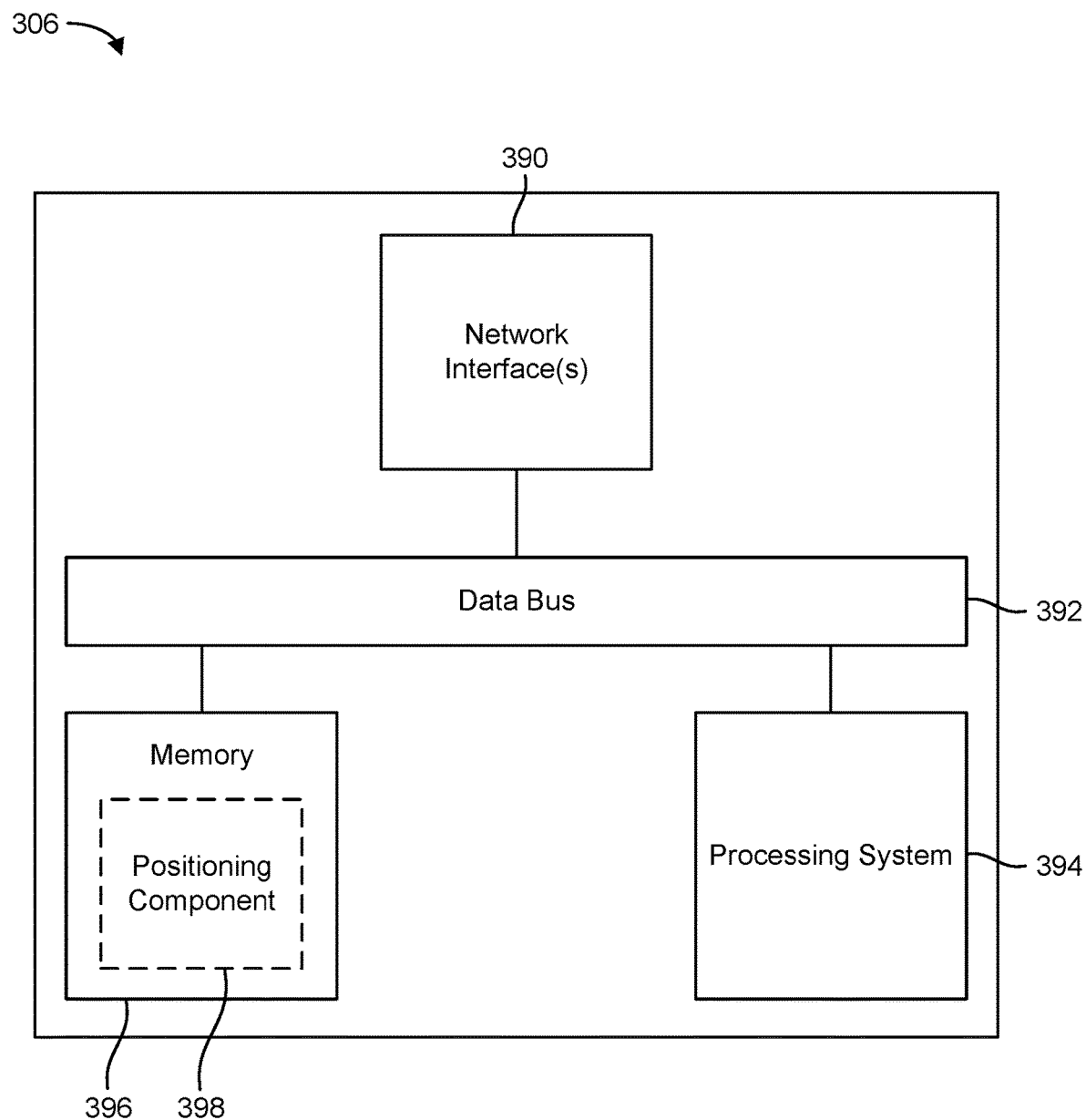

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370, respectively. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and perform calculations necessary to determine positions of the UE 302 and the base station 304, respectively, using measurements obtained by any suitable SPS algorithm.

The base station 304 and the network entity 306 each include at least one network interface 380 and 390, respectively, for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, positioning operations, and for providing other processing functionality. The base station 304 includes a processing system 384 for providing functionality relating to, for example, positioning operations as disclosed herein, and for providing other processing functionality. The network entity 306 includes a processing system 394 for providing functionality relating to, for example, positioning operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.), respectively. Alternatively, the positioning components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the positioning components 342, 388, and 398, etc.

Figure 4A:
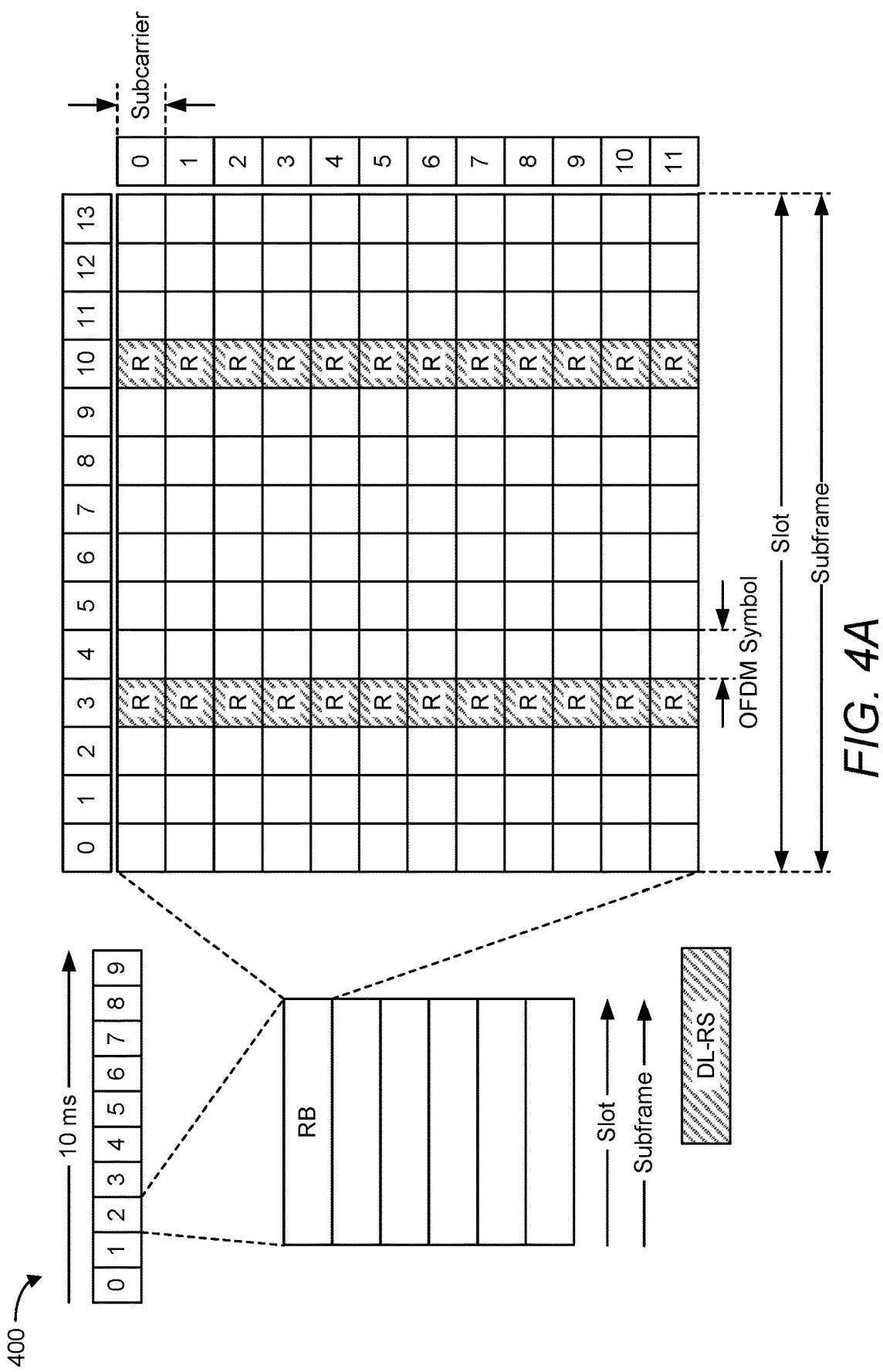
FIGS. 4A to 4D are diagrams illustrating exemplary frame structures and channels within the frame structures, according to aspects of the disclosure.
Figure 4B:
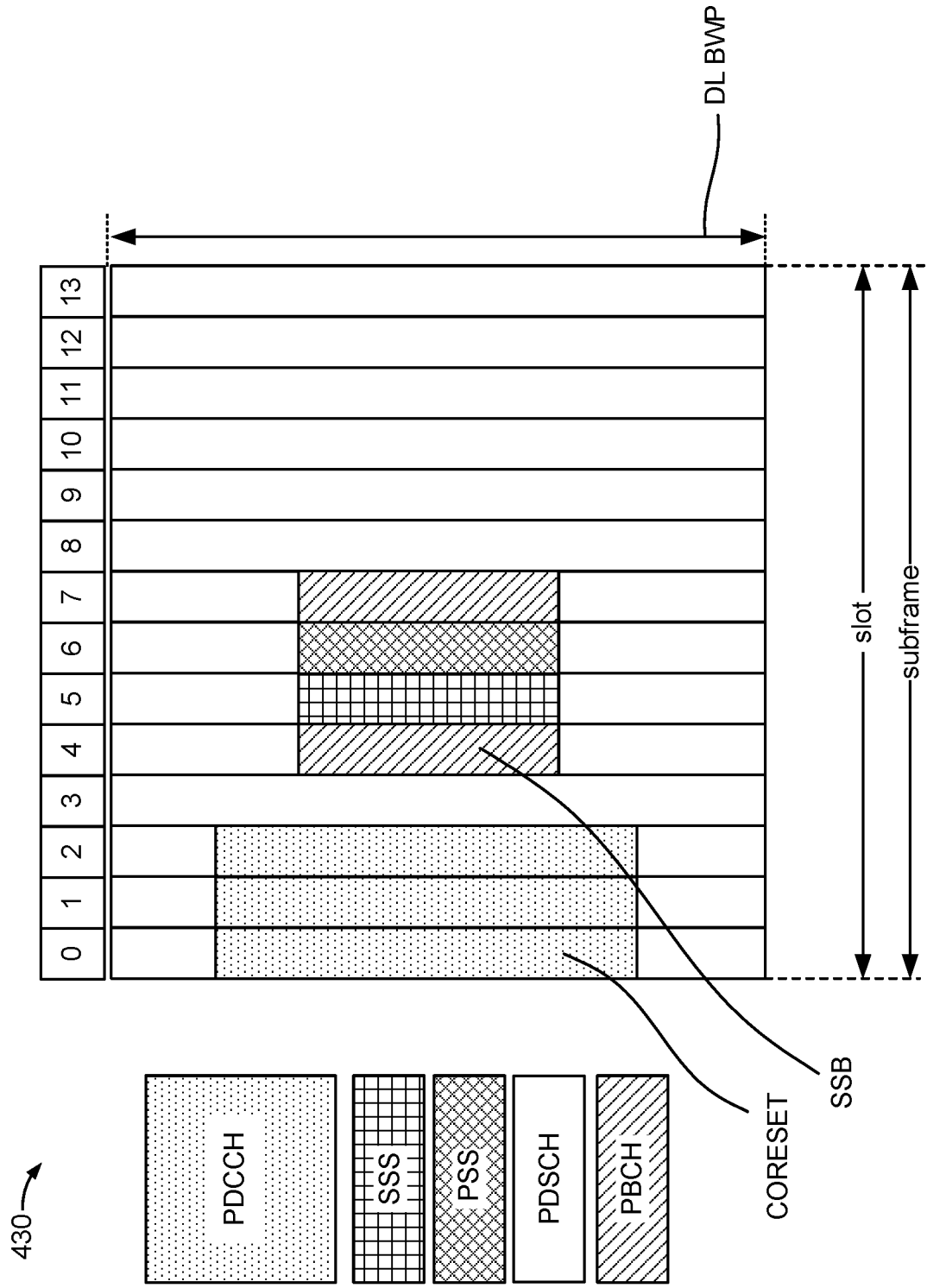
Figure 4C:
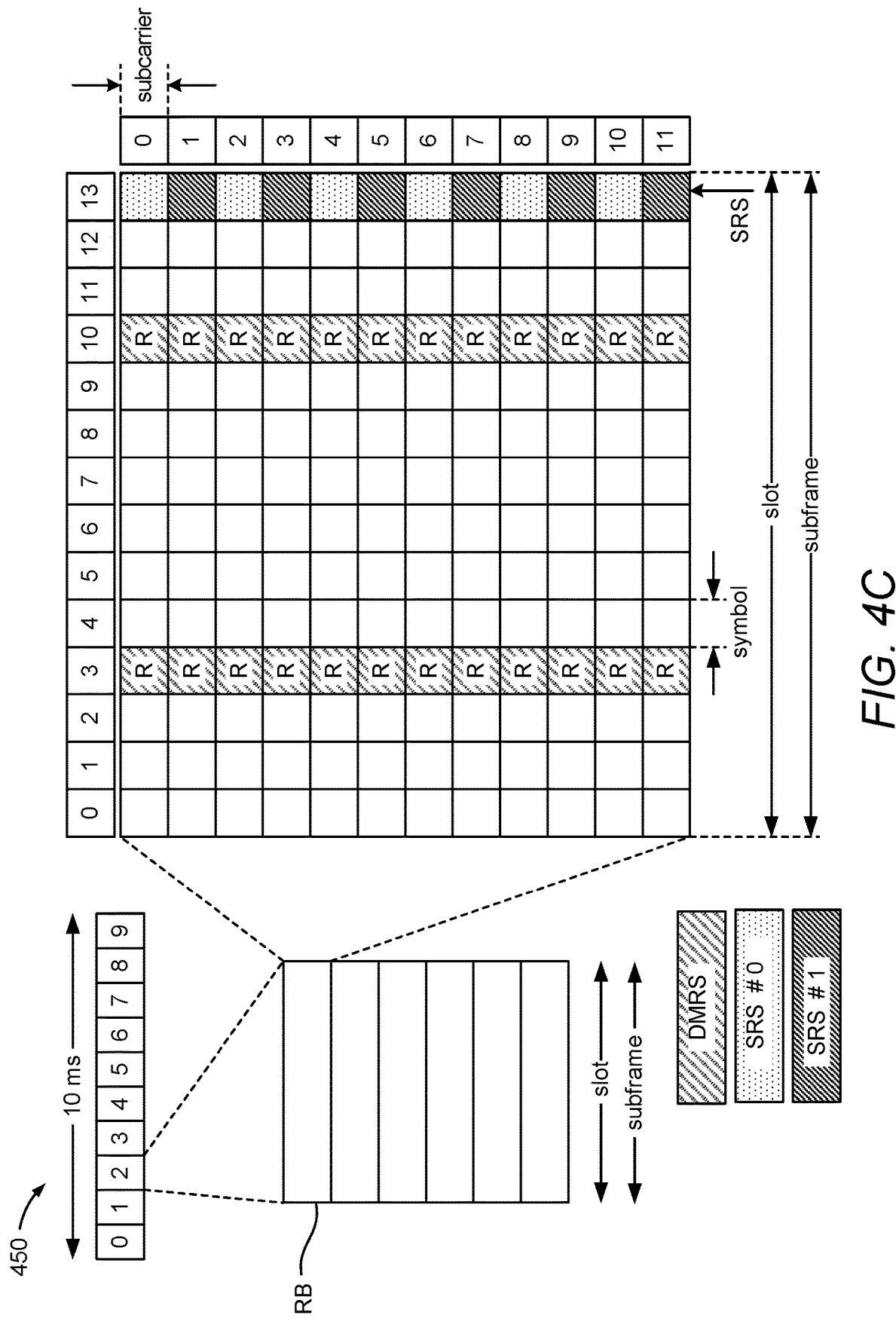
Figure 4D:
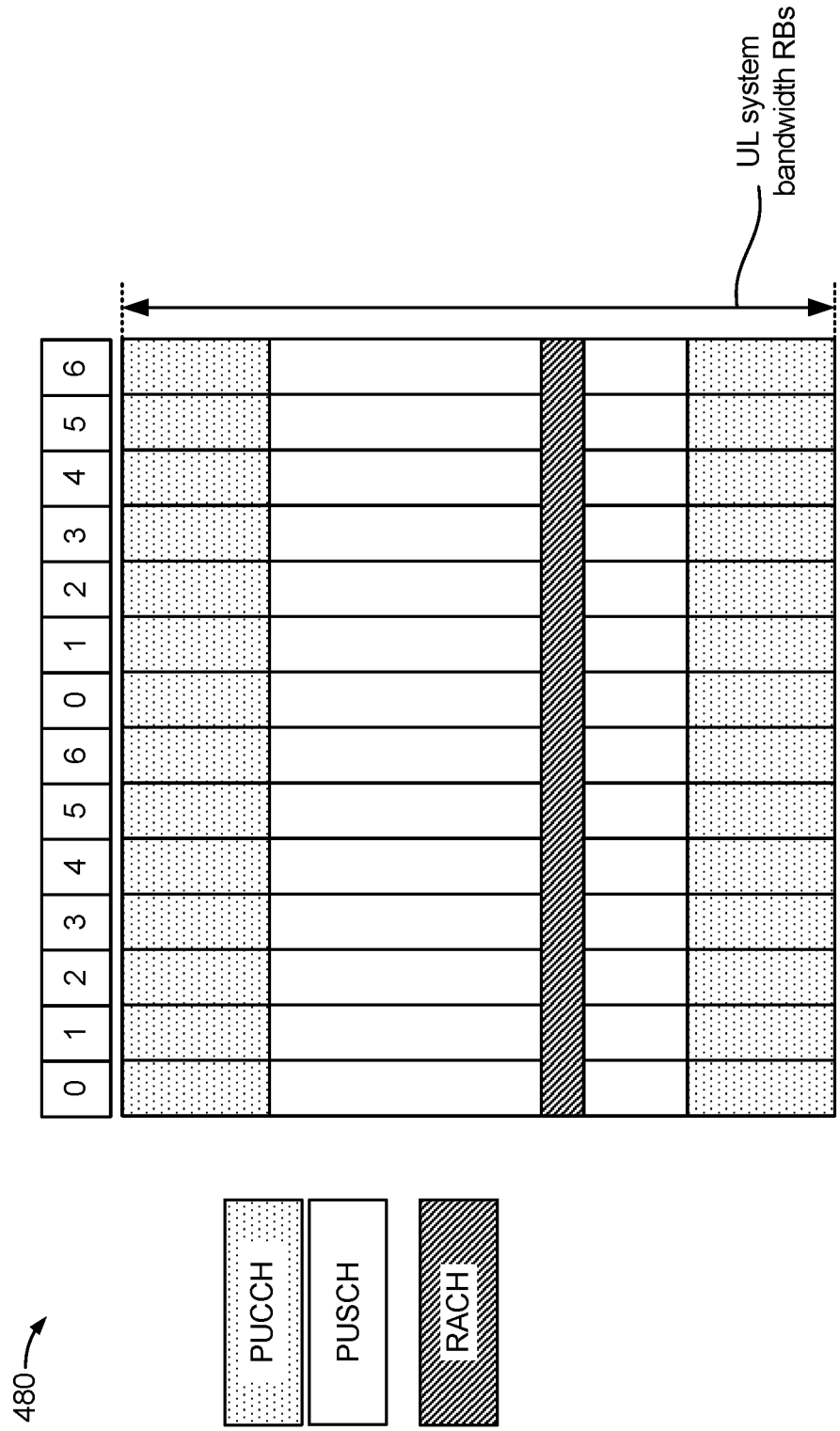

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. FIG. 4C is a diagram 450 illustrating an example of an uplink frame structure, according to aspects of the disclosure. FIG. 4D is a diagram 480 illustrating an example of channels within an uplink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands.

For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (μ), for example, subcarrier spacing of 15 kHz, 30 kHz, 60 kHz, 120 kHz, and 240 kHz or greater may be available. Table 1 provided below lists some various parameters for different NR numerologies.

TABLE 1

| Subcarrier spacing (kHz) | Symbols/ slot | slots/ subframe | slots/ frame | slot (ms) | Symbol duration (μs) | Max. nominal system BW (MHz) with 4K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 240 | 14 | 16 | 160 | 0.0625 | 4.17 | 800 |

In the examples of FIGS. 4A to 4D, a numerology of 15 kHz is used. Thus, in the time domain, a frame (e.g., 10 ms) is divided into 10 equally sized subframes of 1 ms each, and each subframe includes one time slot. In FIGS. 4A to 4D, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A to 4D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

As illustrated in FIG. 4A, some of the REs carry downlink reference (pilot) signals (DL-RS) for channel estimation at the UE. The DL-RS may include demodulation reference signals (DMRS), channel state information reference signals (CSI-RS), cell-specific reference signals (CRS), positioning reference signals (PRS), navigation reference signals (NRS), tracking reference signals (TRS), etc., exemplary locations of which are labeled "R" in FIG. 4A.

A collection of resource elements that are used for transmission of PRS is referred to as a "PRS resource," and may be identified by the parameter DL-PRS-ResourceId. The collection of resource elements (REs) can span multiple PRBs in the frequency domain and N (e.g., 1 or more) consecutive symbol(s) within a slot in the time domain. In a given OFDM symbol in the time domain, a PRS resource occupies consecutive PRBs in the frequency domain.

A "PRS resource set" is a set of PRS resources used for the transmission of PRS signals, where each PRS resource has a PRS resource ID (DL-PRS-ResourceId). In addition, the PRS resources in a PRS resource set are associated with the same TRP. A PRS resource set is identified by a PRS resource set ID (DL-PRS-ResourceSetId) and is associated with a particular TRP (identified by a cell ID). In addition, the PRS resources in a PRS resource set have the same periodicity, a common muting pattern configuration, and the same repetition factor across slots. The periodicity may have a length of $2^\mu \cdot t$ slots, with t selected from a set of {4, 5, 8, 10, 16, 20, 32, 40, 64, 80, 160, 320, 640, 1280, 2560, 5120, 10240}, and μ=0, 1, 2, or 3 (an identifier of the numerology). The repetition factor may have a length of n slots, with n selected from a set of {1, 2, 4, 6, 8, 16, 32}.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance," a "positioning occasion," "a positioning instance," or simply an "occasion" or "instance."

A "positioning frequency layer" is a collection of one or more PRS resource sets across one or more TRPs that have the same subcarrier spacing (SCS) and cyclic prefix (CP) type (meaning all numerologies supported for the physical downlink shared channel (PDSCH) are also supported for PRS), the same value of the downlink PRS bandwidth, the same start PRB (and center frequency), and the same value of comb-size. The Point A parameter takes the value of the parameter ARFCN-ValueNR, where "ARFCN" stands for "absolute radio-frequency channel number," and is an identifier/code that specifies a pair of physical radio channel used for transmission and reception. The downlink PRS bandwidth may have a granularity of four PRBs, with a minimum of 24 PRBs and a maximum of 272 PRBs. The comb-size indicates the number of subcarriers in each symbol carrying PRS. For example, a comb-size of comb-4 means that every fourth subcarrier of a given symbol carries PRS. Currently, up to four frequency layers have been defined, and up to two PRS resource sets may be configured per TRP per frequency layer.

Downlink PRS resource IDs are locally defined within a downlink PRS resource set, and downlink PRS resource set IDs are locally defined within a TRP. To uniquely identify a DL-PRS resource across TRPs, an ID has been defined that can be associated with multiple downlink PRS resource sets associated with a single TRP. This ID can be used along with a downlink PRS resource set ID and a downlink PRS resource ID to uniquely identify a single downlink PRS resource. This ID is referred to herein as DL-PRS-TRP-ResourceSetId. Each TRP should only be associated with one DL-PRS-TRP-ResourceSetId. For example, a DL-PRS-TRP-ResourceSetId may be a cell ID (e.g., PCI, VCI), or a TRP ID, or another identifier that is different than the cell ID or the TRP ID that is used for positioning purposes to participate in the unique identification of a PRS resource.

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, NRS, TRS, CRS, CSI-RS, DMRS, primary synchronization signal (PSS), secondary synchronization signal (SSS), etc.

FIG. 4B illustrates an example of various channels within a downlink slot of a radio frame. In NR, the channel bandwidth, or system bandwidth, is divided into multiple bandwidth parts (BWPs). A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning that the UE may only receive or transmit over one BWP at a time. On the downlink, the bandwidth of each BWP should be equal to or greater than the bandwidth of the SSB, but it may or may not contain the SSB.

Referring to FIG. 4B, a PSS is used by a UE to determine subframe/symbol timing and a physical layer identity. An SSS is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The PDSCH carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

As illustrated in FIG. 4C, some of the REs carry DMRS for channel estimation at the base station. The UE may additionally transmit sounding reference signals (SRS) in, for example, the last symbol of a subframe. The SRS may have a comb structure, and a UE may transmit SRS on one of the combs. The comb structure (also referred to as the "comb size") indicates the number of subcarriers in each symbol period carrying a reference signal (here, SRS). For example, a comb size of comb-4 means that every fourth subcarrier of a given symbol carries the reference signal, whereas a comb size of comb-2 means that every second subcarrier of a given symbol carries the reference signal. In the example of FIG. 4C, the illustrated SRS (e.g., SRS #0 and SRS #1) are both comb-2. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

FIG. 4D illustrates an example of various channels within an uplink subframe of a frame, according to aspects of the disclosure. A random access channel (RACH), also referred to as a physical random access channel (PRACH), may be within one or more subframes within a frame based on the PRACH configuration. The PRACH may include six consecutive RB pairs within a subframe. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

A collection of resource elements that are used for transmission of SRS is referred to as an "SRS resource," and may be identified by the parameter SRS-ResourceId. The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID (SRS-ResourceSetId).

Generally, a UE transmits SRS to enable the receiving base station (either the serving base station or a neighboring base station) to measure the channel quality between the UE and the base station. However, SRS can also be used as uplink positioning reference signals for uplink positioning procedures, such as uplink time-difference of arrival (UT-DOA), multi-round-trip-time (multi-RTT), uplink angle-of-arrival (UL-AoA), etc.

Figure 5A:
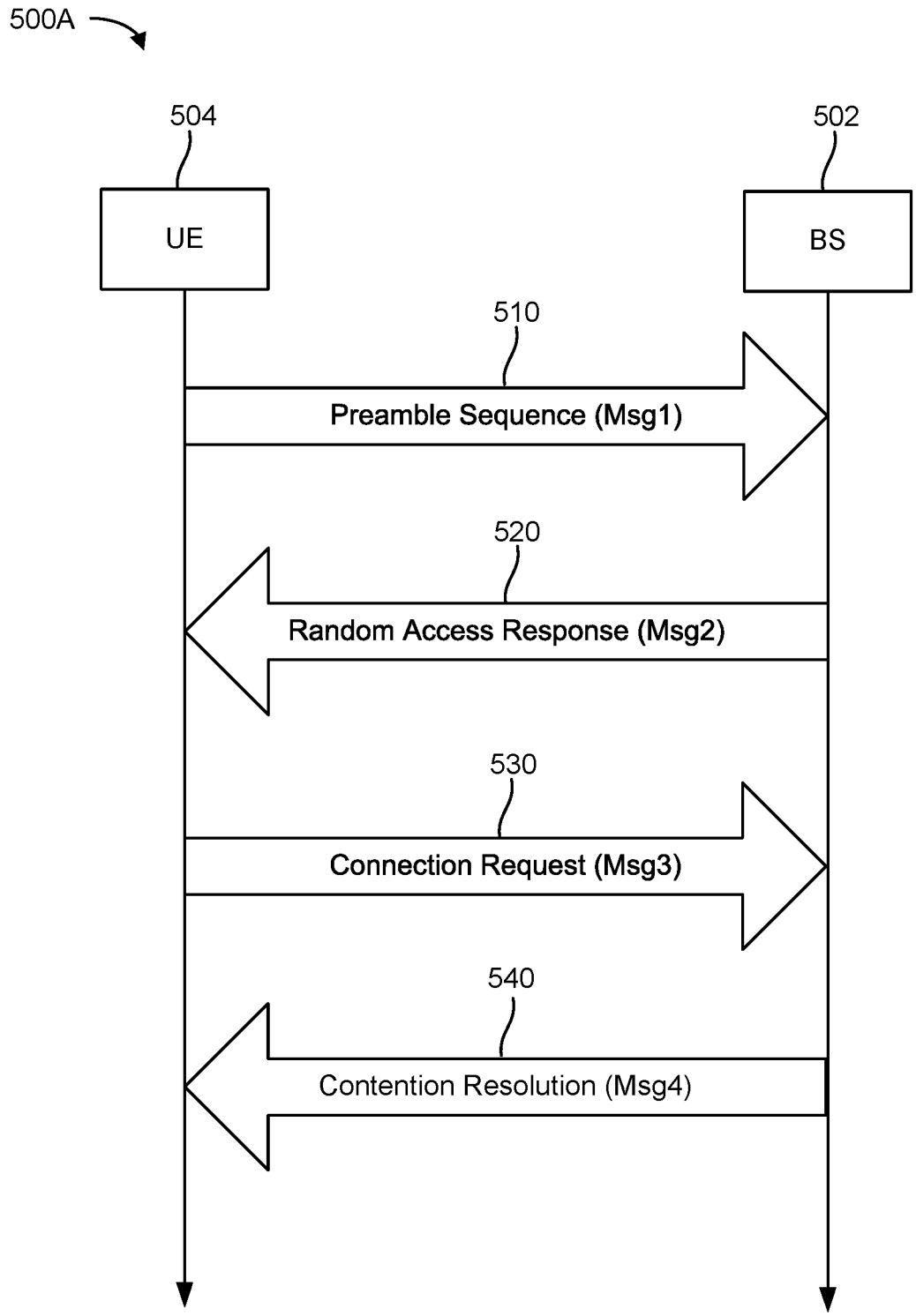
FIGS. 5A and 5B illustrate exemplary random access procedures, according to aspects of the disclosure.

FIG. 5A illustrates an exemplary four-step random access procedure 500A, according to aspects of the disclosure. The four-step random access procedure 500A is performed between a UE 504 and a base station 502, which may correspond to any of the UEs and base stations, respectively, described herein.

There are various situations in which a UE may perform the four-step random access procedure 500A (also referred to as a "RACH procedure," a "PRACH procedure," and the like). For example, a UE may perform the four-step random access procedure 500A when acquiring initial network access after coming out of the RRC idle state, when performing an RRC connection re-establishment procedure, during a handover, when downlink or uplink data arrives and the UE is in an RRC connected state but its uplink synchronization status is "not-synchronized," when transitioning out of the RRC INACTIVE state, when establishing time alignment for the addition of an SCell, when requesting other synchronization information, or when performing beam failure recovery.

Before performing the four-step random access procedure 500A, the UE 504 first reads one or more SSBs broadcasted by the base station 502 with which the UE 504 is performing the four-step random access procedure 500A. In NR, each beam transmitted by a base station (e.g., base station 502) is associated with a different SSB, and a UE (e.g., UE 504) selects a certain beam to use to communicate with the base station 502. Based on the SSB of the selected beam, the UE 504 can then read the SIB type 1 (SIB1), which carries cell access related information and supplies the UE 504 with the scheduling of other system information blocks transmitted on the selected beam.

When the UE sends the very first message of the four-step random access procedure 500A to the base station 502, it sends a specific pattern called a preamble (also referred to as a RACH preamble, a PRACH preamble, a preamble sequence, or a sequence). The RACH preamble differentiates requests from different UEs 504. However, if two UEs 504 use the same RACH preamble at the same time, then there can be a collision. There are a total of 64 such patterns available to a UE 504, and, for contention-based random access, the UE 504 chooses one of them randomly. For contention-free random access, however, the network instructs the UE 504 about which one to use.

At 510, the UE 504 selects one of 64 RACH preambles to send to the base station 502 as a RACH request. This message is referred to as "Message 1" or "Msg1" in a four-step RACH procedure. Based on the synchronization information from the base station 502 (i.e., the SIB1), the UE 504 selects a RACH preamble and sends it at the RACH occasion (RO) corresponding to the selected SSB/beam. More specifically, in order for the base station 502 to determine which beam the UE 504 has selected, a specific mapping is defined between an SSB and an RO (which occur every 10, 20, 40, 80, or 160 ms). By detecting at which RO the UE 504 sent the preamble, the base station 502 can determine which SSB/beam the UE 504 selected.

Note that an RO is a time-frequency transmission opportunity for transmitting a RACH preamble, and a RACH preamble index (i.e., a value from 0 to 63 for the 64 possible preambles) enables the UE 504 to generate the type of RACH preamble expected at the base station 502. The RO and RACH preamble index may be configured to the UE 504 by the base station 502 in a SIB. A RACH resource is an RO in which one RACH preamble index is transmitted. As such, the terms "RO" (or "RACH occasion") and "RACH resource" may be used interchangeably, depending on the context.

Due to reciprocity, the UE 504 may use the uplink transmit beam corresponding to the best downlink receive beam determined during synchronization (i.e., the best receive beam to receive the selected downlink beam from the base station 502). That is, the UE 504 uses the parameters of the downlink receive beam used to receive the beam from the base station 502 to determine the parameters of the uplink transmit beam. If reciprocity is available at the base station 502, the UE 504 can transmit the preamble over one beam. Otherwise, the UE 504 repeats transmission of the same preamble on all of its uplink transmit beams.

The UE 504 also needs to provide its identity to the network (via base station 502) so that the network can address it in the next step. This identity is called the random access radio network temporary identity (RA-RNTI) and is determined from the time slot in which the RACH preamble is sent. If the UE 504 does not receive any response from the base station 502 within some period of time, it increases its transmission power in a fixed step and sends the RACH preamble/Msg1 again.

At 520, the base station 502 sends a random access response (RAR), referred to as a "Message 2" or "Msg2" in a four-step RACH procedure, to the UE 504 on the selected beam. The RAR is sent on a PDSCH and is addressed to the RA-RNTI calculated from the time slot (i.e., RO) in which the preamble was sent. The RAR carries the following information: a cell-radio network temporary identifier (C-RNTI), a timing advance (TA) value, and an uplink grant resource. The base station 502 assigns the C-RNTI to the UE 504 to enable further communication with the UE 504. The TA value specifies how much the UE 504 should change its timing to compensate for the round-trip delay between the UE 504 and the base station 502. The uplink grant resource indicates the initial resources the UE 504 can use on the PUSCH. After this step, the UE 504 and the base station 502 establish coarse beam alignment that can be utilized in the subsequent steps.

At 530, using the allocated PUSCH, the UE 504 sends an RRC connection request message, referred to as a "Message 3" or "Msg3," to the base station 502. Because the UE 504 sends the Msg3 over the resources scheduled by the base station 502, the base station 502 therefore knows where to detect the Msg3 and which uplink receive beam should be used. Note that the Msg3 PUSCH can be sent on the same or different uplink transmit beam than the Msg1.

The UE 504 identifies itself in the Msg3 by the C-RNTI assigned in the previous step. The message contains the UE's 504 identity and connection establishment cause. The UE's 504 identity is either a temporary mobile subscriber identity (TMSI) or a random value. A TMSI is used if the UE 504 has previously connected to the same network. The UE 504 is identified in the core network by the TMSI. A random value is used if the UE 504 is connecting to the network for the very first time. The reason for the random value or TMSI is that the C-RNTI may have been assigned to more than one UE in the previous step, due to multiple requests arriving at the same time. The connection establishment cause indicates the reason why the UE 504 needs to connect to the network, and will be described further below.

At 540, if the Msg3 was successfully received, the base station 502 responds with a contention resolution message, referred to as a "Message 4" or "Msg4." This message is addressed to the TMSI or random value (from the Msg3) but contains a new C-RNTI that will be used for further communication. Specifically, the base station 502 sends the Msg4 in the PDSCH using the downlink transmit beam determined in the previous step.

The four-step random access procedure 500A described above is a contention-based random access procedure. In contention-based random access, any UE 504 connecting to the same cell or TRP sends the same request, in which case there is a possibility of collision among the requests from the various UEs 504. In contention-free random access, the network can instruct a UE 504 to use some unique identity to prevent its request from colliding with requests from other UEs. A contention-free random access procedure can be performed when the UE 504 is in an RRC connected mode before the random access procedure, such as in the case of a handover.

Figure 5B:
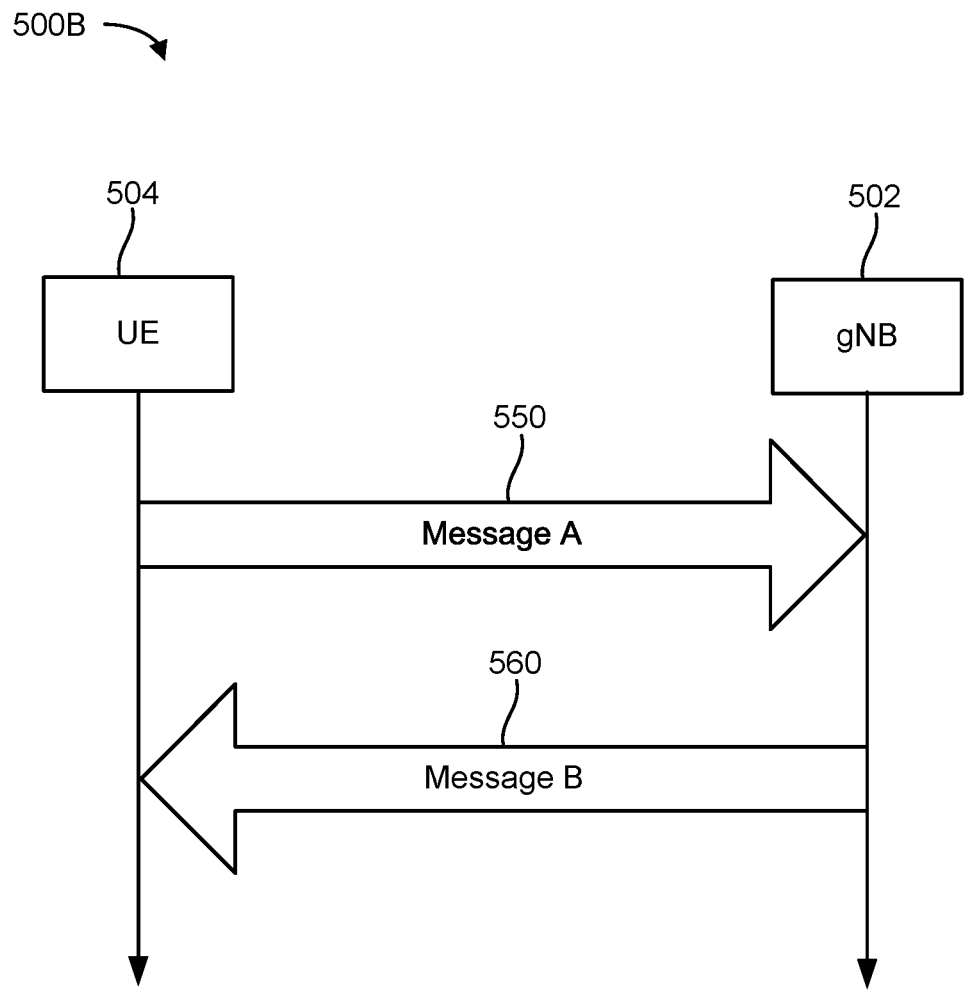

FIG. 5B illustrates an exemplary two-step random access procedure 500B, according to aspects of the disclosure. The two-step random access procedure 500B is performed between the UE 504 and the base station 502.

At 550, the UE 504 transmits a RACH Message A ("MsgA") to the base station 502. In a two-step random access procedure 500B, Msg1 and Msg3, described above with reference to FIG. 5A, are collapsed (e.g., combined) into MsgA and sent to the base station 502. As such, a MsgA includes a RACH preamble and a PUSCH, similar to the Msg3 PUSCH of a four-step RACH procedure. The RACH preamble may have been selected from 64 possible preambles, as described above with reference to FIG. 5A, and may be used as a reference signal for demodulation of the data transmitted in the MsgA. At 560, the UE 504 receives a RACH Message B ("MsgB") from the base station 502. The MsgB may be a combination of Msg2 and Msg4 described above with reference to FIG. 5A.

The combination of Msg1 and Msg3 into one MsgA and the combination of Msg2 and Msg4 into one MsgB allows the UE 504 to reduce the RACH procedure setup time to support the low-latency requirements of 5G NR. Although the UE 504 may be configured to support the two-step random access procedure 500B, the UE 504 may still support the four-step random access procedure 500A as a fall back if the UE 504 is not be able to use the two-step random access procedure 500B due to some constraints (e.g., high transmit power requirements, etc.). Therefore, a UE in 5G NR may be configured to support both the two-step and the four-step random access procedures, and may determine which random access procedure to configure based on the RACH configuration information received from the base station.

After the random access procedure 500A or 500B, the UE 504 is in an RRC connected state. The RRC protocol is used on the air interface between the UE 504 and the base station 502.

Due to UE mobility/movement, beam reconfiguration at the base station, and/or other factors, a downlink beam (e.g., comprising a downlink control link), which may have been the preferred active beam, may fail to be detected at the UE, or the signal quality (e.g., RSRP, RSRQ, SINR, etc.) may fall below a threshold, causing the UE to consider it as a beam/link failure. A beam recovery procedure may be employed to recover from such a beam failure. A beam failure may refer to, for example, failure to detect a strong (e.g., with signal power greater than a threshold) active beam, which may, in some aspects, correspond to a control channel communicating control information from the network. In certain aspects, in order to facilitate beam failure detection, a UE may be preconfigured with beam identifiers (IDs) of a first set of beams (referred to as "set_q0") to be monitored, a monitoring period, a signal strength threshold, etc. The recovery may be triggered when a signal strength (e.g., RSRP, RSRQ, SINR, etc.) associated with the one or more monitored beams (as detected by the UE) falls below a threshold. The recovery process may include the UE identifying a new beam, for example, from a second set of possible beams (corresponding to beam IDs that may be included in a second set, referred to as "set_q1"), and performing a random access procedure (e.g., as illustrated in FIGS. 5A and 5B) using preconfigured time and frequency resources corresponding to the new preferred beam. The beam IDs corresponding to the beams in the second set of beams (set_q1) may be preconfigured at the UE for use for beam failure recovery purposes. For example, the UE may monitor downlink beams (based on the beam IDs and resources identified in the second set), perform measurements, and determine (e.g., based on the measurements) which beam out of all received and measured beams may be the best for reception at the UE from the UE's perspective.

If beam correspondence is assumed (i.e., the direction of the best receive beam used by the UE is also considered the best direction for the transmit beam used by the UE), then the UE may assume the same beam configuration for both reception and transmission. That is, based on monitoring downlink reference signals from the base station, the UE can determine its preferred uplink transmit beam weights, which will be the same as for the downlink receive beam used for receiving the downlink reference signals.

Where beam correspondence is not assumed (e.g., deemed not suitable in the given scenario or for other reasons), the UE may not derive the uplink transmit beam from the downlink receive beam. Instead, separate signaling is needed to select the uplink transmit and downlink receive beam weights and for the UL-to-DL beam pairing. The UE may perform a RACH procedure (e.g., using the preconfigured time and frequency resources indicated in the second set of beams, set_q1) to identify the uplink transmit beam. Performing the RACH procedure using the preconfigured time and frequency resources may comprise, for example, transmitting a RACH preamble on one or more uplink transmit beams (corresponding to the beam IDs in the second set of beams, set_q1) on allocated RACH resources corresponding to the one or more beams. Based on the RACH procedure, the UE may be able to determine and confirm with the base station which uplink direction may be the best beam direction for an uplink channel (e.g., PUCCH). In this manner, both uplink transmit and downlink receive beams may be reestablished and beam recovery may be completed.

Figure 6:
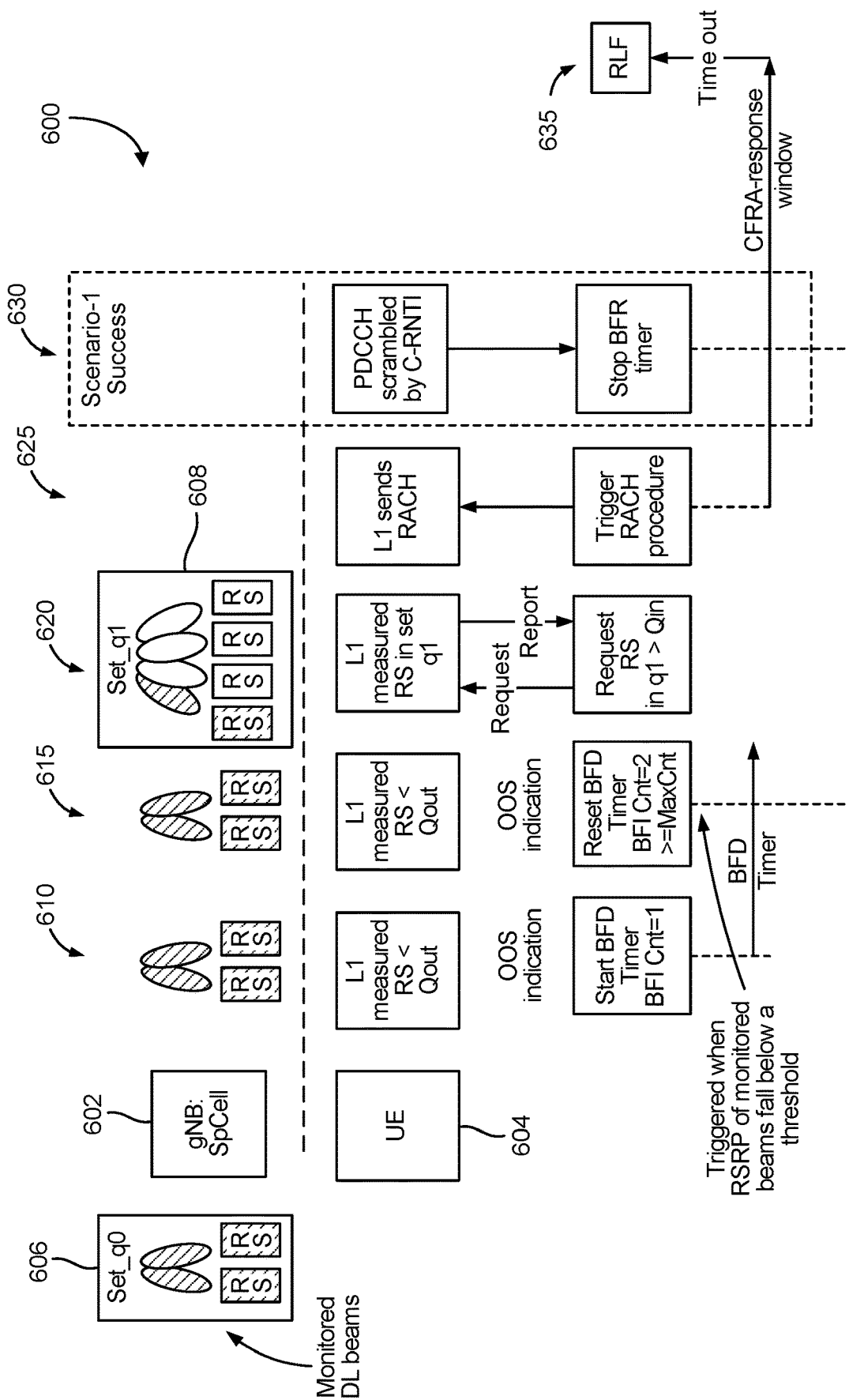
FIG. 6 is a diagram of an exemplary random access-based SpCell beam failure recovery procedure, according to aspects of the disclosure.

FIG. 6 is a diagram 600 of an exemplary RACH-based SpCell beam failure recovery procedure, according to aspects of the disclosure. In the example of FIG. 6, for simplicity, the PCell and SCell are shown to be associated with a single base station (e.g., the hardware/circuitry for implementing the PCell and SCell may be collocated at the same base station). However, in some other configurations, the PCell and SCell may be associated with different base stations that may be synchronized.

In the example of FIG. 6, a PCell or a primary (i.e., in active use) SCell (together referred to as an "SpCell") is supported by a base station 602 (illustrated as a "gNB," and which may correspond to any of the base stations described herein). A UE 604 (which may correspond to any of the UEs described herein) monitors the received signal strength (e.g., RSRP, RSRQ, SINR, etc.) of periodic reference signals (e.g., PRS) transmitted by the base station 602 on a first set ("set_q0") of downlink transmit beams 606 of the SpCell. The first set of downlink transmit beams 606 is referred to as the "failure detection resource set" because the base station 602 sends the beam IDs of the beams in the first set of downlink transmit beams 606 to the UE 604 to enable the UE 604 to monitor these beams to determine whether or not the downlink control link (i.e., a control channel communicating control information from the network) between the base station 602 and the UE 604 is active. In the example of FIG. 6, the first set of downlink transmit beams 606 includes two beams. However, there may be only one beam or more than two beams in the first set of downlink transmit beams 606.

At 610, the UE 604 fails to detect a periodic reference signal transmitted on at least one of the beams in the first set of downlink transmit beams 606, and/or detects that a quality metric (e.g., RSRP, RSRQ, SINR, etc.) associated with the reference signal has fallen below a signal quality threshold (represented in FIG. 6 as "Qout"). The Qout threshold may be configured by the base station 602. More specifically, the Layer 1 ("L1" in FIG. 6) functionality of the UE 604 (e.g., implemented in the WWAN transceiver 310) detects that the measured quality metric of the periodic reference signal is below the Qout threshold, and sends an out-of-sync (OOS) indication to the processing system 332 (which implements the Layer 2 and Layer 3 functionality of the UE 604). In response to receiving the OOS indication, the processing system 332 of the UE 604 starts a beam failure detection (BFD) timer and initializes a beam failure indicator (BFI) counter to "1."

At 615, the UE 604 again fails to detect the periodic reference signal transmitted on the at least one of the beams in the first set of downlink transmit beams 606, and/or again detects that the quality metric associated with the reference signal has fallen below the Qout threshold. Again, more specifically, the Layer 1 functionality of the UE 604 detects that the measured quality metric of the periodic reference signal is below the Qout threshold, and sends another OOS indication to the processing system 332. The processing system 332 increments the BFI count to "2." Because the BFI count has reached the maximum count ("MaxCnt") threshold (which is "2" in the example of FIG. 6 but which may be another value) while the BFD timer is running, the UE 604 determines that there has been a beam failure of the at least one beam (e.g., a downlink control beam) in the first set of downlink transmit beams 606. Because there is a failure of a downlink control beam (corresponding to the downlink control channel communicating control information from the network), the UE 604 assumes that there is also a failure of the corresponding uplink control beam (corresponding to the uplink control channel for communicating control information to the network). As such, the UE 604 needs to identify a new downlink control beam and re-establish an uplink control beam. The UE 604 also resets the BFD timer.

Thus, at 620, in response to the beam failure detection at 615, the UE 604 initiates a beam failure recovery procedure. More specifically, the processing system 332 of the UE 604 requests that the Layer 1 functionality of the UE 604 identify at least one beam in a second set ("set_q1") of downlink transmit beams 608 that carries a periodic reference signal with a received signal strength greater than a signal quality threshold (represented as "Qin"). The second set of downlink transmit beams 608 is referred to as the "candidate beam reference signal list." The UE 604 may receive both the beam IDs of the beams in the second set of downlink transmit beams 608 and the Qin threshold from the base station 602. In the example of FIG. 6, the second set of downlink transmit beams 608 includes four beams, one of which (shaded) carries periodic reference signals having a received signal strength greater than the Qin threshold. However, as will be appreciated, there may be more or fewer than four beams in the second set of downlink transmit beams 608, and there may be more than one beam that meets the Qin threshold. The WWAN transceiver 310 (implementing Layer 1 functionality) reports the identified candidate beam to the processing system 332. The identified candidate beam can then be used as the new downlink control beam, although not necessarily immediately.

At 625, to re-establish an uplink control beam, the UE 604 performs a RACH procedure (e.g., as illustrated in FIGS. 5A and 5B) on the one or more candidate downlink transmit beams identified at 620 (one in the example of FIG. 6). More specifically, the processing system 332 instructs the WWAN transceiver 310 to send a RACH preamble (which may be pre-stored or provided to the UE 604 by the base station 602) to the base station 602. The WWAN transceiver 310 sends the RACH preamble (also referred to as a Message 1 ("Msg1")) on one or more candidate uplink transmit beams corresponding to the one or more candidate downlink transmit beams identified at 620 on preconfigured RACH resources for the one or more candidate uplink transmit beams. The preconfigured RACH resources may correspond to the SpCell (e.g., in the mmW band). Although not illustrated in FIG. 6, at 625, the UE 604 also starts a beam failure recovery (BFR) timer that defines a contention-free random access (CFRA) response window.

The one or more candidate downlink transmit beams identified at 620 can include beams that are different than the downlink transmit beam associated with the beam failure. As used herein, a "beam" is defined by beam weights associated with an antenna array of the UE 604. Hence, in some aspects, whether used for uplink transmission by the UE 604 or downlink reception by the UE 604, the weights applied to each antenna in the array to construct the transmitted or received beam define the beam. As such, the one or more candidate uplink transmit beams on which the RACH preamble is sent may have different weights than the downlink transmit beam associated with the beam failure, even if such candidate uplink transmit beam is in generally a similar direction as the downlink transmit beam indicated to be failing.

At 630, the base station 602 transmits a RACH response (referred to as a "Msg1 response") to the UE 604 with a C-RNTI via a PDCCH associated with the SpCell. For example, the response may comprise cyclic redundancy check (CRC) bits scrambled by the C-RNTI. After the WWAN transceiver 310 of the UE 604 processes the received response with the C-RNTI via the SpCell PDCCH from the base station 602 and determines that the received PDCCH is addressed to the C-RNTI, the processing system 332 determines that the beam failure recovery procedure has completed and stops the BFR timer started at 625. In an aspect, the C-RNTI may be mapped to a beam direction determined by the base station 602 to be the best direction for an uplink channel (e.g., PUCCH) for the UE 604. Accordingly, upon receipt of the response with C-RNTI from the base station 602, the UE 604 may be able to determine the optimal uplink transmit beam that is best suited for the uplink channel.

The operations at 630 are part of a first scenario in which the UE 604 successfully recovers from the beam failure detected at 615. However, such a recovery may not always occur, or at least not before the BFR timer started at 625 times out. If the BFR timer expires before the beam failure recovery procedure completes successfully, then at 635, the UE 604 determines that a radio link failure (RLF) has occurred.

Figure 7:
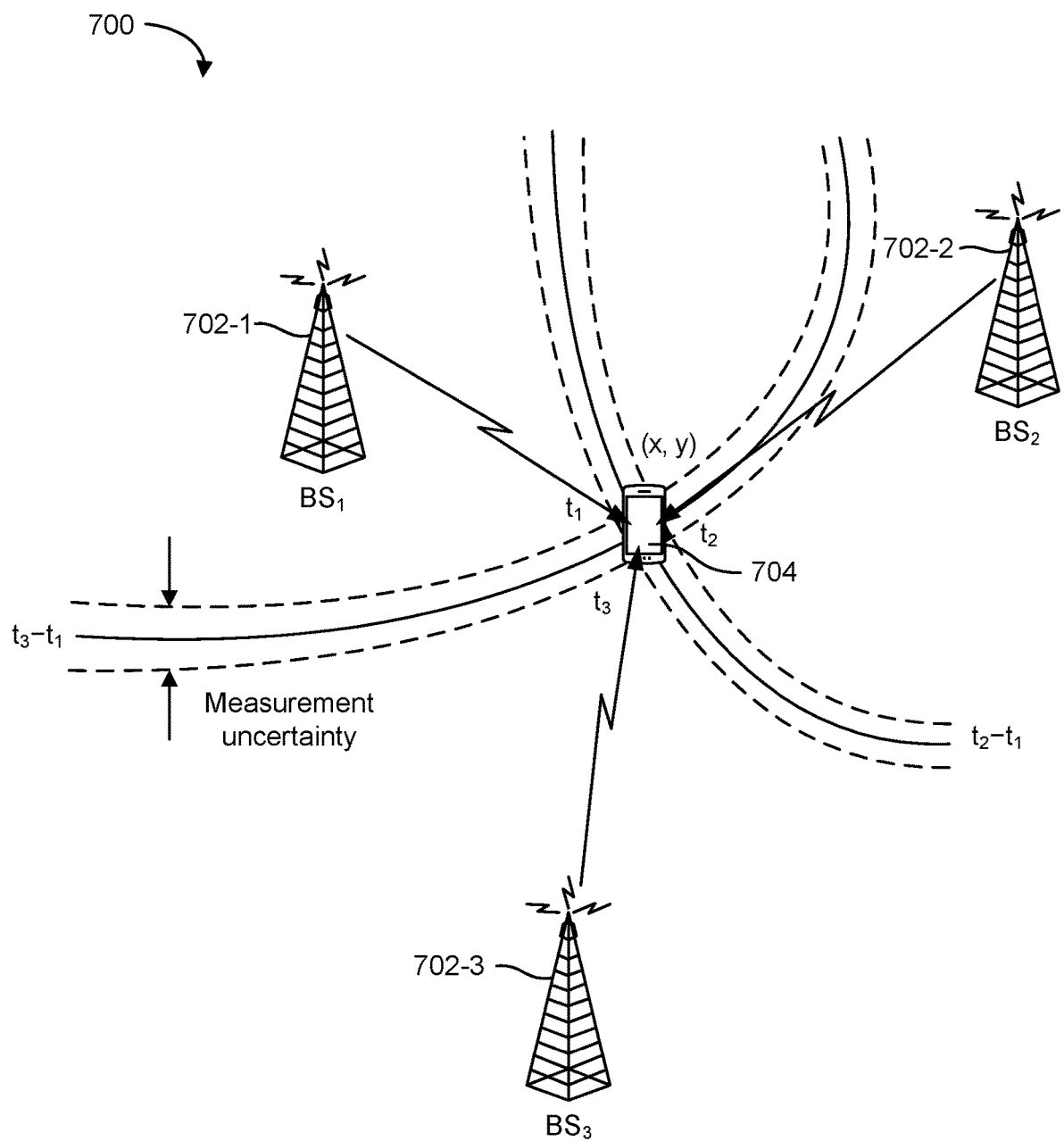
FIG. 7 is a diagram illustrating an exemplary technique for determining a position of a mobile device using information obtained from a plurality of base stations.

FIG. 7 illustrates an exemplary wireless communications system 700 according to various aspects of the disclosure. In the example of FIG. 7, a UE 704, which may correspond to any of the UEs described herein, is attempting to calculate an estimate of its position, or assist another entity (e.g., a base station or core network component, another UE, a location server, a third party application, etc.) to calculate an estimate of its position. The UE 704 may communicate wirelessly with a plurality of base stations 702-1, 702-2, and 702-3 (collectively, base stations 702), which may correspond to any combination of the base stations described herein, using RF signals and standardized protocols for the modulation of the RF signals and the exchange of information packets. By extracting different types of information from the exchanged RF signals, and utilizing the layout of the wireless communications system 700 (e.g., the base stations locations, geometry, etc.), the UE 704 may determine its position, or assist in the determination of its position, in a predefined reference coordinate system. In an aspect, the UE 704 may specify its position using a two-dimensional (2D) coordinate system; however, the aspects disclosed herein are not so limited, and may also be applicable to determining positions using a three-dimensional (3D) coordinate system, if the extra dimension is desired. Additionally, while FIG. 7 illustrates one UE 704 and three base stations 702, as will be appreciated, there may be more UEs 704 and more or fewer base stations 702.

To support position estimates, the base stations 702 may be configured to broadcast positioning reference signals (e.g., PRS, NRS, TRS, CRS, etc.) to UEs 704 in their coverage area to enable a UE 704 to measure characteristics of such reference signals. For example, the OTDOA positioning method, also referred to as the time difference of arrival (TDOA) positioning method, is a multilateration method in which the UE 704 measures the time difference, known as a RSTD, between specific reference signals (e.g., PRS, NRS, TRS, CRS, etc.) transmitted by different pairs of network nodes (e.g., base stations 702, antennas of base stations 702, etc.) and either reports these time differences to a location server, such as the location server 230 or LMF 270, or computes a location estimate itself from these time differences.

Generally, RSTDs are measured between a reference network node (e.g., base station 702-1 in the example of FIG. 7) and one or more neighbor network nodes (e.g., base stations 702-2 and 702-3 in the example of FIG. 7). The reference network node remains the same for all RSTDs measured by the UE 704 for any single positioning use of OTDOA and would typically correspond to the serving cell for the UE 704 or another nearby cell with good signal strength at the UE 704. In an aspect, where a measured network node is a cell supported by a base station, the neighbor network nodes would normally be cells supported by base stations different from the base station for the reference cell and may have good or poor signal strength at the UE 704. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., location server 230, LMF 270) may provide OTDOA assistance data to the UE 704 for the reference network node (e.g., base station 702-1 in the example of FIG. 7) and the neighbor network nodes (e.g., base stations 702-2 and 702-3 in the example of FIG. 7) relative to the reference network node. For example, the assistance data may provide the center channel frequency of each network node, various reference signal configuration parameters (e.g., the number of consecutive positioning subframes, periodicity of positioning subframes, muting sequence, frequency hopping sequence, reference signal identifier (ID), reference signal bandwidth), a network node global ID, and/or other cell related parameters applicable to OTDOA. The OTDOA assistance data may indicate the serving cell for the UE 704 as the reference network node.

In some cases, OTDOA assistance data may also include "expected RSTD" parameters, which provide the UE 704 with information about the RSTD values the UE 704 is expected to measure at its current location between the reference network node and each neighbor network node, together with an uncertainty of the expected RSTD parameter. The expected RSTD, together with the associated uncertainty, may define a search window for the UE 704 within which the UE 704 is expected to measure the RSTD value. OTDOA assistance information may also include reference signal configuration information parameters, which allow a UE 704 to determine when a reference signal positioning occasion occurs on signals received from various neighbor network nodes relative to reference signal positioning occasions for the reference network node, and to determine the reference signal sequence transmitted from various network nodes in order to measure a signal time of arrival (ToA) or RSTD.

In an aspect, while the location server (e.g., location server 230, LMF 270) may send the assistance data to the UE 704, alternatively, the assistance data can originate directly from the network nodes (e.g., base stations 702) themselves (e.g., in periodically broadcasted overhead messages, etc.). Alternatively, the UE 704 can detect neighbor network nodes itself without the use of assistance data.

The UE 704 (e.g., based in part on the assistance data, if provided) can measure and (optionally) report the RSTDs between reference signals received from pairs of network nodes. Using the RSTD measurements, the known absolute or relative transmission timing of each network node, and the known position(s) of the transmitting antennas for the reference and neighboring network nodes, the network (e.g., location server 230/LMF 270, a base station 702) or the UE 704 may estimate a position of the UE 704. More particularly, the RSTD for a neighbor network node "k" relative to a reference network node "Ref" may be given as ($ToA_k - ToA_{Ref}$), where the ToA values may be measured modulo one subframe duration (1 ms) to remove the effects of measuring different subframes at different times. In the example of FIG. 7, the measured time differences between the reference cell of base station 702-1 and the cells of neighboring base stations 702-2 and 702-3 are represented as $t_2-t_1$ and $t_3-t_1$, where $t_1$, $t_2$, and $t_3$ represent the ToA of a reference signal from the transmitting antenna(s) of base stations 702-1, 702-2, and 702-3, respectively. The UE 704 may then convert the ToA measurements for different network nodes to RSTD measurements and (optionally) send them to the location server 230/LMF 270. Using (i) the RSTD measurements, (ii) the known absolute or relative transmission timing of each network node, (iii) the known position(s) of physical transmitting antennas for the reference and neighboring network nodes, and/or (iv) directional reference signal characteristics such as a direction of transmission, the UE's 704 position may be determined (either by the UE 704 or the location server 230/LMF 270).

Still referring to FIG. 7, when the UE 704 obtains a location estimate using OTDOA measured time differences, the necessary additional data (e.g., the network nodes' locations and relative transmission timing) may be provided to the UE 704 by a location server (e.g., location server 230, LMF 270). In some implementations, a location estimate for the UE 704 may be obtained (e.g., by the UE 704 itself or by the location server 230/LMF 270) from OTDOA measured time differences and from other measurements made by the UE 704 (e.g., measurements of signal timing from GPS or other global navigation satellite system (GNSS) satellites). In these implementations, known as hybrid positioning, the OTDOA measurements may contribute towards obtaining the UE's 704 location estimate but may not wholly determine the location estimate.

UTDOA is a similar positioning method to OTDOA, but is based on uplink reference signals (e.g., SRS, uplink PRS) transmitted by the UE (e.g., UE 704). Further, transmission and/or reception beamforming at the base station 702 and/or UE 704 can enable wideband bandwidth at the cell edge for increased precision. Beam refinements may also leverage channel reciprocity procedures in 5G NR.

Another uplink positioning procedure is UL-AOA. In UL-AoA positioning, the base station uses the angle and other properties (e.g., signal strength) of the uplink receive beam on which it receives reference signals (e.g., SRS) to estimate the location of the UE. The base station, or other positioning entity, may also use the signal propagation time between the base station and the UE to determine the distance between the base station and the UE to further refine the location estimate of the UE. The signal propagation time, or flight time, may be determined using multi-RTT.

The term "position estimate" is used herein to refer to an estimate of a position for a UE, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

As noted above, an "RF signal" comprises an electromagnetic wave that transports information through the space between a transmitter and a receiver. An RF signal typically suffers from some amount of path loss, or path attenuation, which is the reduction in power density (attenuation) of an electromagnetic wave (the RF signal) as it propagates through space. Path loss may be due to many effects, such as free-space loss, refraction, diffraction, reflection, aperture-medium coupling loss, and absorption. Path loss is also influenced by terrain contours, environment (e.g., urban or rural, vegetation and foliage, etc.), propagation medium (e.g., dry or moist air), the distance between the transmitter and the receiver, and the height and location of the transmit antenna(s).

A transmitter (e.g., a base station or a UE) may transmit a single RF signal or multiple RF signals to a receiver (e.g., a UE or a base station). However, the receiver may receive multiple RF signals corresponding to each transmitted RF signal due to the propagation characteristics of RF signals through multipath channels. The same transmitted RF signal on different paths between the transmitter and receiver may be referred to as a "multipath" RF signal. Multipath RF signals combine at the receiver, resulting in a received signal that may vary widely, depending on the distribution of the intensity and relative propagation time of the waves and bandwidth of the transmitted signal.

As noted above, during UTDOA positioning procedures (and other uplink or uplink-plus-downlink positioning procedures, such as multi-RTT and UL-AoA), a UE transmits uplink reference signals, such as SRS and uplink PRS, that need to be transmitted with a high enough transmit power that they can be measured by neighboring cells. Because neighboring cells may be further away from the UE than the serving cell, there may be more path loss between the UE and the neighboring cell than between the UE and the serving cell. As such, these uplink reference signals may need to be transmitted with a higher transmit power than uplink signals transmitted to the serving cell.

Several options have been identified for setting the transmission power of uplink reference signals transmitted for positioning purposes (e.g., UTDOA). As a first option, the transmit power of such uplink reference signals may be constant (i.e., no power control is supported). As a second option, the transmit power of uplink reference signals may be based on the existing power control procedure. As a third option, the transmit power may be determined by modifying the existing power control procedure. For example, a downlink reference signal of a neighboring cell can be configured to be used for the path loss estimation for an uplink reference signal. More specifically, the UE can estimate the path loss of the downlink reference signal and determine the appropriate transmit power for the uplink reference signal based on the determined path loss. In an aspect, the downlink reference signals may be a CSI-RS, an SSB, a downlink PRS, etc.

Referring to the third option, using a downlink reference signal from a neighboring cell to estimate the path loss of an uplink reference signal, various other features need to be supported in 5G NR in addition to the existing legacy behaviour. For example, there needs to be support for configuring a downlink reference signal of a neighboring cell to be used as the downlink path loss reference for the purposes of uplink reference signal power control. However, there is no fall back procedure currently specified if the UE is not able to obtain the path loss reference. Accordingly, the present disclosure describes various fall back procedures if the UE is not able to obtain the path loss reference.

In addition to using a downlink reference signal to determine the transmit power of an uplink reference signal, a UE can use a downlink reference signal from a neighboring cell to determine the spatial direction of an uplink transmit beam (also referred to as spatial transmit QCL, spatial QCL, spatial transmit beam, and the like) carrying uplink reference signals (again in the case of a positioning procedure). The downlink reference signal to determine the transmit power of an uplink reference signal and the downlink reference signal to determine the spatial direction of an uplink transmit beam may be, but need not be, the same downlink reference signal. For uplink beam management/alignment towards the serving and neighboring cells, various features (in addition to UE transmit beam sweeping) are currently supported. First, the configuration of a spatial relation between a downlink reference signal from the serving cell or neighboring cell(s) and the target uplink reference signal is supported. Downlink reference signals that can be used include at least an SSB, and possibly CSI-RS and PRS. Second, a fixed transmit beam for uplink reference signal transmissions across multiple uplink reference signal resources, for both FR1 and FR2, is supported. Note that currently, a UE is not expected to transmit multiple uplink reference signal resources with different spatial relations in the same OFDM symbol.

As noted above, the UE can calculate the transmit power for an uplink reference signal based on the path loss of a downlink reference signal. The UE can do so as follows. If a UE transmits uplink reference signals (e.g., SRS) on uplink BWP b of carrier f of serving cell c using an SRS power control adjustment state with index l, the UE determines the SRS transmission power $P_{SRS,b,f,c}(i,q_s,l)$ in SRS transmission occasion i as (in dBm):

$$P_{SRS,b,f,c}(i, q_s, l) = \min \begin{Bmatrix} P_{CMAX,f,c}(i), \\ P_{O\_SRS,b,f,c}(q_s) + 10\log_{10}(2^\mu \times M_{SRS,b,f,c}(i)) + \\ a_{SRS,b,f,c}(q_s) \times PL_{b,f,c}(q_d) + h_{b,f,c}(i, l) \end{Bmatrix}$$

where:
$P_{CMAX,f,c}(i)$ is the configured UE transmit power for carrier f of serving cell c in SRS transmission occasion i;

$P_{O\_SRS,b,f,c}(q_s)$ is provided by higher layer parameter p0 for uplink BWP b of carrier f of serving cell c and SRS resource set $q_s$ provided by higher layer parameters SRS-ResourceSet and SRS-ResourceSetId. If p0 is not provided, $P_{O\_SRS,b,f,c}(q_s)=P_{O\_NOMINALPUSCH,f,c}(0)$;

$M_{SRS,b,f,c}(i)$ is the SRS bandwidth expressed in number of resource blocks for SRS transmission occasion i on active uplink BWP b of carrier f of serving cell c and μ is a SCS configuration;

$a_{SRS,b,f,c}(q_s)$ is provided by higher layer parameter alpha for uplink BWP b of carrier f of serving cell c and SRS resource set $q_s$;

$PL_{b,f,c}(q_d)$ is a downlink path loss estimate in dB calculated by the UE using reference signal index $q_d$ for a downlink BWP that is linked with uplink BWP b of carrier f of serving cell c and SRS resource set $q_s$. The reference signal index $q_d$ is provided by the higher layer parameter pathlossReferenceRS associated with the SRS resource set $q_s$ and is either a higher layer parameter ssb-Index providing an SS/PBCH block index or a higher layer parameter csi-RS-Index providing a CSI-RS resource index. If the UE is not provided the higher layer parameter pathlossReferenceRS or before the UE is provided dedicated higher layer parameters, the UE calculates $PL_{b,f,c}(q_d)$ using a reference signal resource obtained from the SS/PBCH block index that the UE uses to obtain the MIB. If the UE is provided pathlossReferenceLinking, the reference signal resource is on a serving cell indicated by a value of pathlossReferenceLinking;

$h_{b,f,c}(i, l)=f_{b,f,c}(i, l)$, where $f_{b,f,c}(i, l)$ is the current PUSCH power control adjustment state, if the higher layer parameter srs-PowerControlAdjustmentStates indicates the same power control adjustment state for SRS transmissions and PUSCH transmissions.

As noted above, a maximum of four BWPs can be specified in the downlink and uplink. Currently, there may be up to four path loss estimates per serving cell, one for each BWP. Specifically, a UE does not expect to simultaneously maintain more than four path loss estimates per serving cell for all PUSCH/PUCCH/SRS transmissions. The pathlossReferenceLinking parameter indicates whether the UE shall apply as path loss reference either the downlink of the PCell or the SCell that corresponds with this uplink.

As noted above, some wireless communications networks, such as 5G NR, may employ mmW or near mmW frequencies to increase the network capacity. The use of mmW frequencies may be in addition to microwave frequencies (e.g., in the sub-6 GHz band) that may also be supported for use in communication, e.g., when carrier aggregation is used. Because communication at high mmW frequencies utilizes directionality (e.g., communication via directional beams) to compensate for higher propagation loss, a base station and a UE may need to align their beams during both initial network access (e.g., a random access procedure, as illustrated in FIGS. 5A and 5B) and subsequent data transmissions to ensure maximum gain. The base station and the UE may determine the best beams for communicating with each other, and the subsequent communications between the base station and the UE may be via the selected beams. However, due to UE mobility/movement, beam reconfiguration at the base station, and/or other factors, a downlink beam (e.g., comprising a downlink control link), which may have been the preferred active beam, may fail to be detected at the UE, or the signal quality may fall below a threshold, causing the UE to consider it as a beam/link failure.

A beam recovery procedure (e.g., as illustrated in FIG. 6) may be employed to recover from a beam failure. A beam failure may refer to, for example, failure to detect a strong (e.g., with signal power greater than a threshold) downlink transmit beam, a failure to accurately (e.g., based on a signal strength threshold) measure the path loss of a reference signal, or the like. The recovery process may include the UE performing a random access procedure (e.g., as illustrated in FIGS. 5A and 5B) to request a new beam assignment. Specifically, the UE may indicate a new SSB or CSI-RS for a new transmit beam during the random access procedure. The base station assigns a new beam based on the beam failure recovery request from the UE by transmitting a downlink assignment or uplink grant on the PDCCH. Subsequently, a new beam pair (i.e., transmit/receive beam pair) can be established.

Performing a path loss estimation or spatial transmit beam determination (also referred to as spatial transmit QCL determination) on a downlink reference signal from a neighboring (non-serving) cell may be a difficult task since the neighboring cell may be far away. The path loss estimate is prone to errors, and as a result, the transmit power or spatial transmit determination made by the UE may be prone to errors. As such, there are various issues that need to be addressed, such as how the UE should inform the location server (e.g., location server 230, LMF 270) that the path loss reference signal or spatial transmit beam reference signal is failing, how the UE should transmit the uplink reference signal resources while the downlink reference signals are failing, and the procedure to avoid the failure of the path loss or spatial transmit estimation for neighboring cells.

When the UE is configured to perform path loss estimation or a spatial transmit QCL determination using a downlink reference signal from a neighboring cell, and the UE identifies that the reference signal cannot be used for this purpose, there are several options as to how the UE can inform the location server that the reference signal is failing. As a first option, the UE can inform the serving base station (which then informs the location server) through, for example, RRC signaling, or the UE can inform the location server directly through higher layer signaling (e.g., LTE positioning protocol (LPP)) that the path loss downlink reference signal or spatial transmit QCL downlink reference signal for a specific uplink reference signal resource is failing. As a second option, the UE can request to be configured with an alternative and/or a secondary downlink reference signal from the serving cell to replace the affected uplink reference signal resource(s). As a third option, the UE can request to be configured with an alternative and/or a secondary downlink reference signal from the neighboring cell(s) to replace the affected uplink reference signal resource(s).

Being configured with an alternative downlink reference signal means that the UE may have been configured with multiple downlink reference signals and may choose one of them. Being configured with a secondary downlink reference signal means that the UE is configured with a primary downlink reference signal, but can use the secondary downlink reference signal if the primary downlink reference signal fails. The first three options are complementary, insofar as the UE may report that the downlink reference signal has failed (first option) and request a replacement (second and third options).

As a fourth option, the UE can start a random access procedure with the serving cell, as in the case of a beam failure recovery procedure, but with a preamble sequence number that indicates that the neighboring cell's downlink transmit beam has failed, rather than a downlink transmit beam from the serving cell. Based on the sequence number, the serving cell can then inform the location server or the neighboring cell(s) through a higher layer protocol (e.g., the Xn interface) of the beam failure. As a fifth option, the UE can start a partial beam failure recovery procedure, meaning that the UE may report that a subset (more than one) of the neighboring downlink reference signals has failed. This report may be through the regular PUCCH/PUSCH channel, rather than the PRACH, as in the fourth option. The serving cell can then inform the location server or the neighboring cell(s) of the failure through a higher layer protocol (e.g., the Xn interface).

Another issue is how the UE should transmit the uplink reference signal resources while the downlink reference signals are failing. When the UE is configured to perform path loss estimation using a downlink reference signal from a neighboring cell, and the UE identifies that the reference signal cannot be used for this purpose, there are various options the UE can follow. If the downlink reference signal is being used for a path loss reference, then as a first option, the UE can transmit the uplink reference signal at its maximum transmit power until a new downlink reference signal is configured for path loss estimation. The UE may transmit at its maximum transmit power under the assumption that if it can no longer detect the downlink reference signal from the neighboring cell, it is because the neighboring cell is far away. As a second option, the UE can use a configured secondary downlink reference signal (as requested above) from the serving cell or a neighboring cell to assist with the path loss estimation. As a third option, the UE can use the path loss downlink reference signal configured for the uplink reference signal of the serving cell (or of the PUSCH/PUCCH). As a fourth option, the UE can use a default downlink transmit beam (i.e., the same downlink transmit beam) for both the path loss reference signal and the spatial QCL reference signal. For example, the UE could use the transmit beam with the lowest uplink reference signal resource ID.

If the downlink reference signal is being used for a spatial QCL reference, then as a first option, the UE can use a configured secondary downlink reference signal from the serving cell to assist with the derivation of the uplink transmit beam (spatial QCL). As a second option, if the UE has been configured with multiple downlink reference signals from a specific neighboring cell, the UE can transmit the effected resource with one of the uplink transmit beams derived from the other downlink reference signals of the same neighboring cell. As a third option, if the UE has only been configured with one downlink reference signal from the neighboring cell, the UE can transmit the effected resource with an uplink transmit beam derived from a downlink reference signal of the serving cell. As a fourth option, the UE can use a default downlink transmit beam (i.e., the same downlink transmit beam) for both the path loss downlink reference signal and the spatial QCL downlink reference signal. For example, the UE could use the transmit beam with the lowest uplink reference signal resource ID.

As will be appreciated, other than using the maximum transmit power in the case of a failed downlink reference signal being used for a path loss reference, the options for both path loss and spatial QCL uplink reference signals are similar.

Referring now to the procedure to avoid the failure of the path loss/spatial transmit QCL estimation downlink reference signals from neighboring cells, there are several steps that can be taken. First, the location server can configure the UE with downlink reference signals from neighboring cells to perform the path loss or spatial transmit beam determination. Second, the UE can periodically report the RSRP, RSRQ, and/or SINR of any downlink reference signals from neighboring cells that are being used for path loss or spatial transmit QCL estimation of uplink reference signal transmissions. Alternatively, the location server can configure for which downlink reference signals such reporting would be helpful. This may be accomplished through direct reporting to the location server or reporting to the base station, which then relays the report to either neighboring base stations (e.g., via the Xn interface) or to the location server (e.g., location server 230, LMF 270). Third, when the RSRP/RSRQ/SINR is low, the location server can proactively reconfigure the downlink reference signals.

An RSRP/RSRQ/SINR threshold can be used to decide whether the current downlink reference signal can be used for path loss reference estimation or spatial QCL determination.

Figure 8:
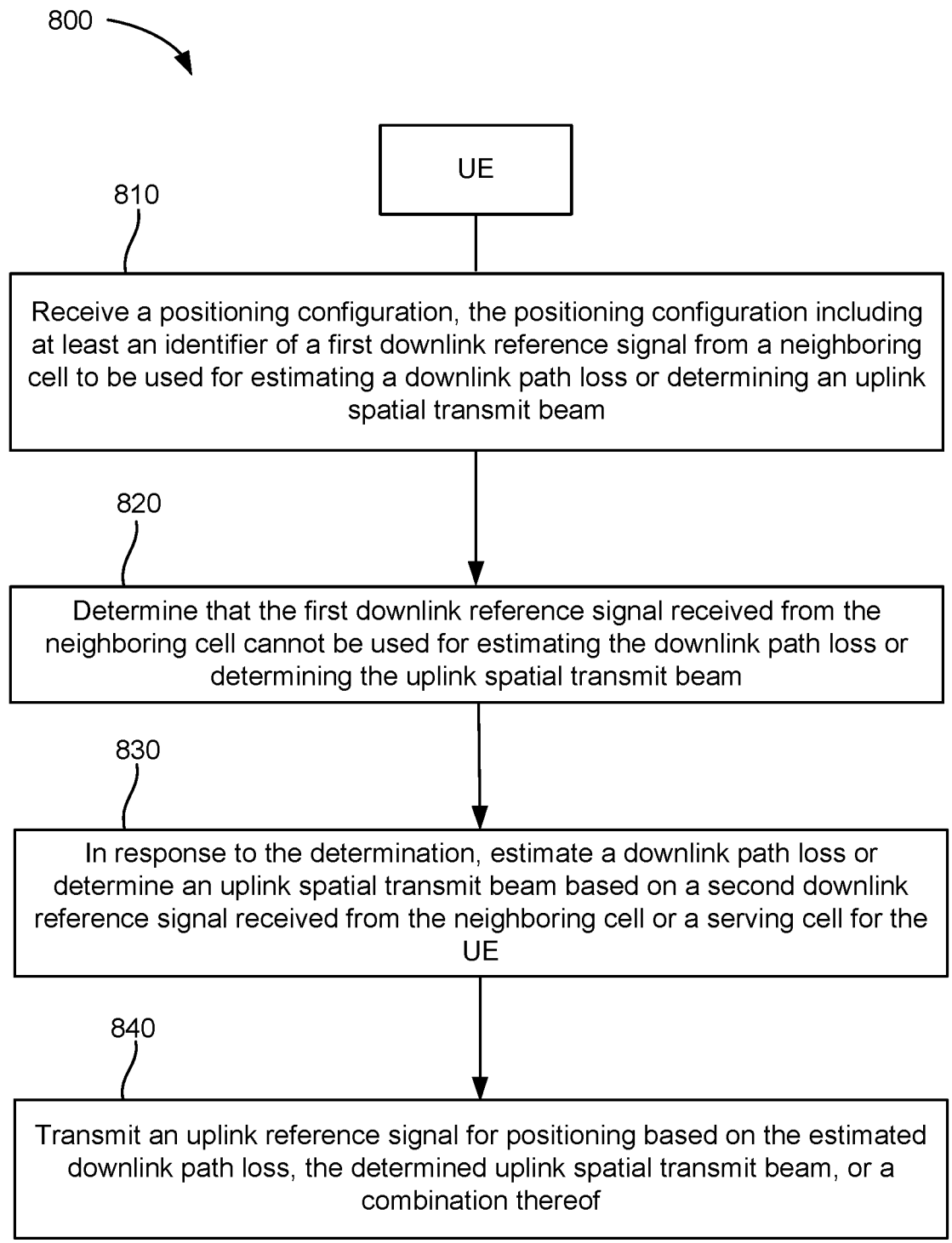
FIGS. 8-10 illustrate exemplary methods of wireless communication, according to aspects of the disclosure.

FIG. 8 illustrates an exemplary method 800 of wireless communication, according to aspects of the disclosure. In an aspect, the method 800 may be performed by a UE (e.g., any of the UEs described herein).

At 810, the UE receives a positioning configuration (e.g., via RRC, LPP, and/or other signaling from a location server, serving cell, or other such entity), the positioning configuration including at least an identifier of a first downlink reference signal from a neighboring cell to be used for estimating a downlink path loss or determining an uplink spatial transmit beam. In an aspect, operation 810 may be performed by WWAN transceiver 310, processing system 332, memory component 340, and/or positioning component 342, and or all of which may be considered means for performing this operation.

At 820, the UE determines whether or not the first downlink reference signal received from the neighboring cell has failed. In an aspect, operation 820 may be performed by WWAN transceiver 310, processing system 332, memory component 340, and/or positioning component 342, and or all of which may be considered means for performing this operation.

At 830, in response to determining that the first downlink reference signal has failed, the UE estimates the downlink path loss or determines the uplink spatial transmit beam based on a second downlink reference signal received from the neighboring cell or a serving cell for the UE. In an aspect, operation 830 may be performed by WWAN transceiver 310, processing system 332, memory component 340, and/or positioning component 342, and or all of which may be considered means for performing this operation.

At 840, the UE transmits an uplink reference signal for positioning based on the estimated downlink path loss, the determined uplink spatial transmit beam, or a combination thereof. In an aspect, operation 840 may be performed by WWAN transceiver 310, processing system 332, memory component 340, and/or positioning component 342, and or all of which may be considered means for performing this operation.

Figure 9:
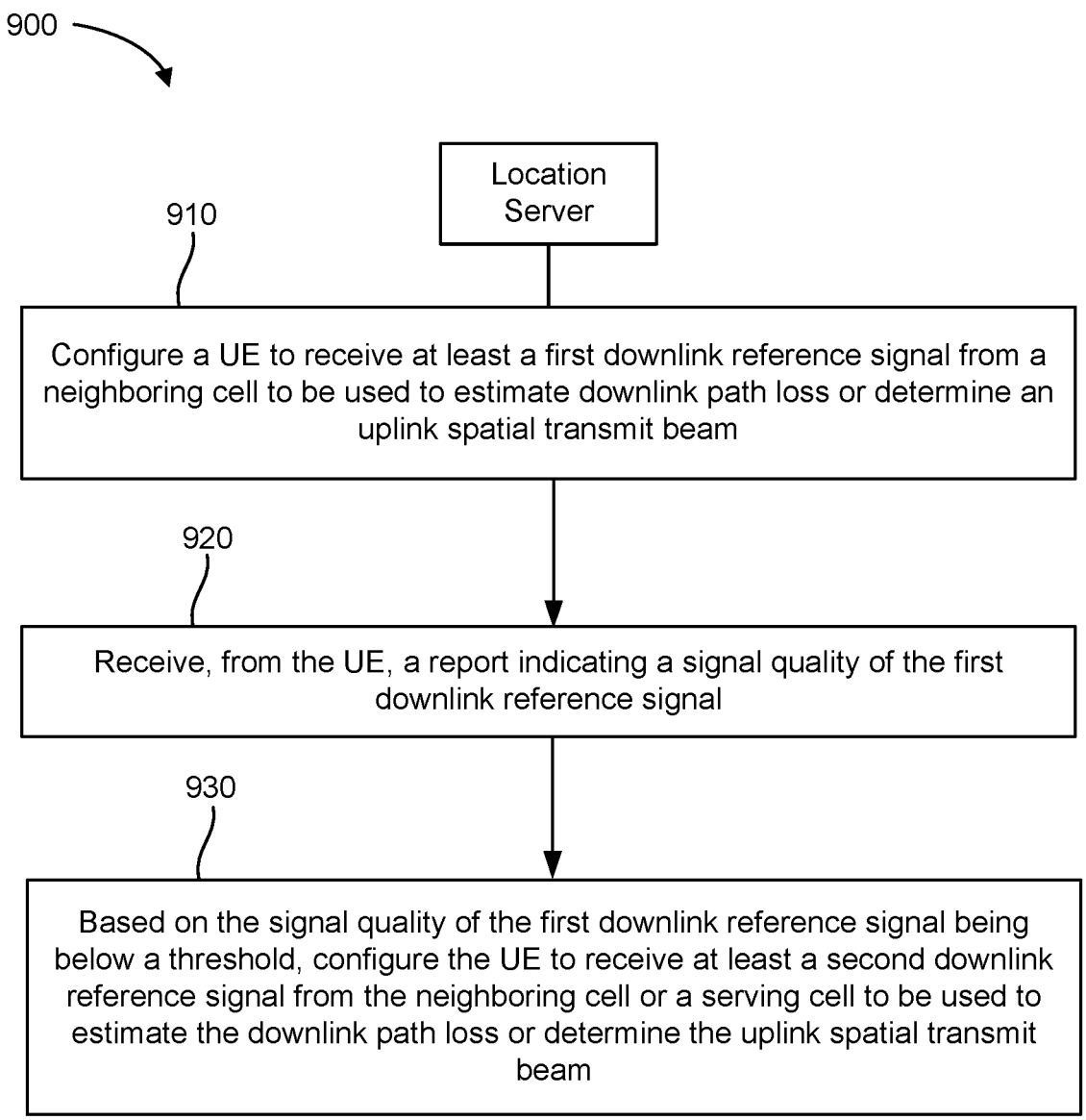

FIG. 9 illustrates an exemplary method 900 of wireless communication, according to aspects of the disclosure. In an aspect, method 900 may be performed by a location server (e.g., location server 230, LMF 270).

At 910, the location server configures (e.g., via LPP) a UE (e.g., any of the UEs described herein) to receive at least a first downlink reference signal from a neighboring cell to be used to estimate a downlink path loss or determine an uplink spatial transmit beam. In an aspect, operation 910 may be performed by network interface(s) 390, processing system 394, memory component 396, and/or positioning component 398, and or all of which may be considered means for performing this operation.

At 920, the location server receives, from the UE, a report indicating a signal quality of the first downlink reference signal. In an aspect, operation 920 may be performed by network interface(s) 390, processing system 394, memory component 396, and/or positioning component 398, and or all of which may be considered means for performing this operation.

At 930, based on the signal quality of the first downlink reference signal being below a threshold, the location server configures the UE to receive at least a second downlink reference signal from the neighboring cell or a serving cell to be used to estimate the downlink path loss or determine the uplink spatial transmit beam. In an aspect, operation 930 may be performed by network interface(s) 390, processing system 394, memory component 396, and/or positioning component 398, and or all of which may be considered means for performing this operation.

Figure 10:
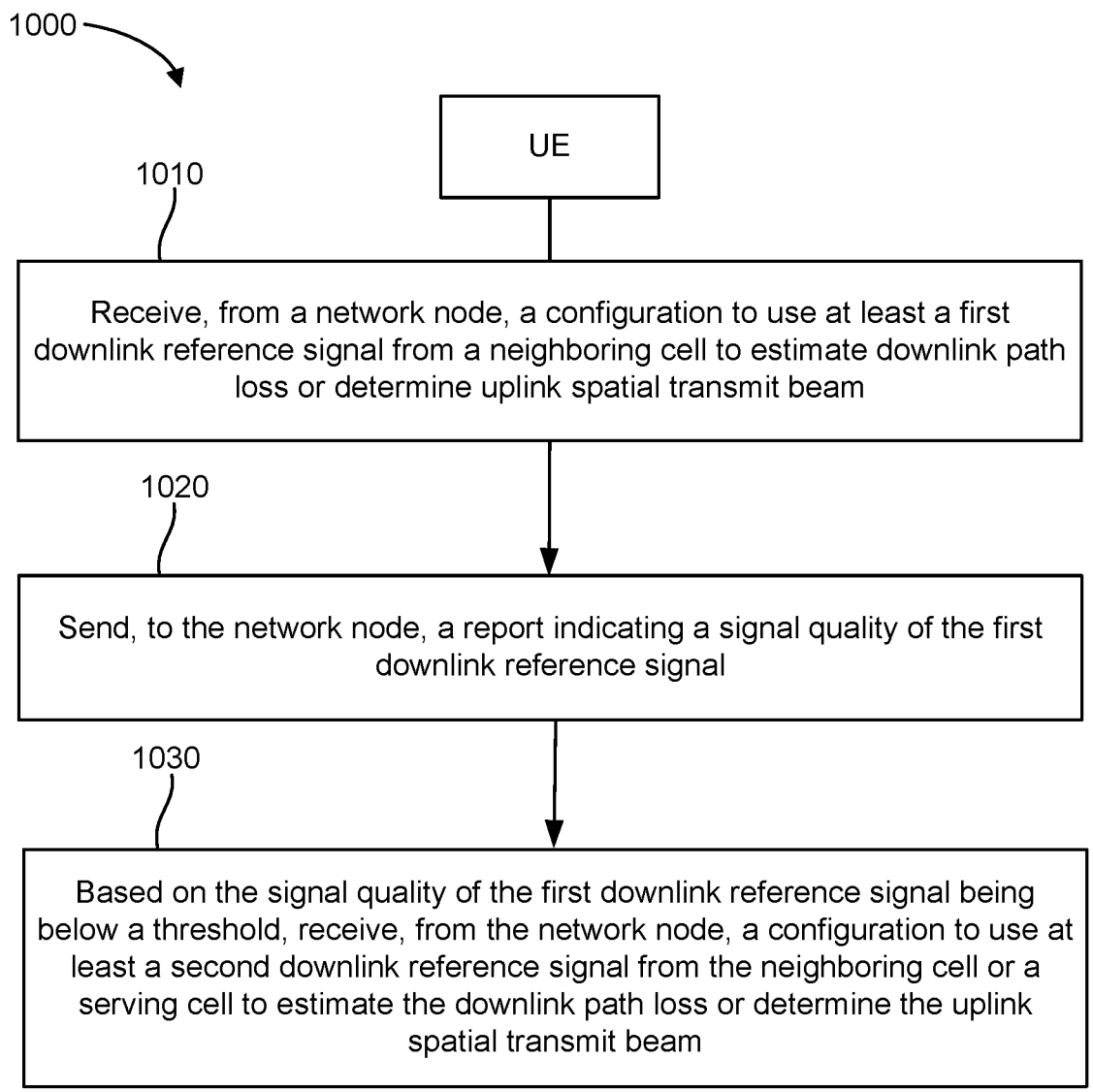

FIG. 10 illustrates an exemplary method 1000 of wireless communication, according to aspects of the disclosure. In an aspect, the method 1000 may be performed by a UE (e.g., any of the UEs described herein).

At 1010, the UE receives, from a network node (e.g., a serving base station or a location server), a configuration (e.g., via RRC, LPP, and/or other signaling from a location server, serving cell, or other such entity) to use at least a first downlink reference signal from a neighboring cell to estimate downlink path loss or determine an uplink spatial transmit beam. In an aspect, operation 1010 may be performed by WWAN transceiver 310, processing system 332, memory component 340, and/or positioning component 342, and or all of which may be considered means for performing this operation.

At 1020, the UE sends, to the network node, a report indicating a signal quality of the first downlink reference signal. In an aspect, operation 1020 may be performed by WWAN transceiver 310, processing system 332, memory component 340, and/or positioning component 342, and or all of which may be considered means for performing this operation.

At 1030, based on the signal quality of the first downlink reference signal being below a threshold, the UE receives, from the network node, a configuration (e.g., via RRC, LPP, and/or other signaling from a location server, serving cell, or other such entity) to use at least a second downlink reference signal from the neighboring cell or a serving cell to estimate the downlink path loss or determine the uplink spatial transmit beam. In an aspect, operation 1030 may be performed by WWAN transceiver 310, processing system 332, memory component 340, and/or positioning component 342, and or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a location server, comprising:
   configuring a user equipment (UE) to receive at least a first downlink reference signal from a neighboring cell to be used to estimate a downlink path loss or determine an uplink spatial transmit beam;
   receiving, from the UE, a report indicating a signal quality of the first downlink reference signal; and
   based on the signal quality of the first downlink reference signal being below a threshold, configuring the UE to receive at least a second downlink reference signal from the neighboring cell or a serving cell to be used to estimate the downlink path loss or determine the uplink spatial transmit beam.

2. The method of claim 1, wherein the signal quality of the first downlink reference signal being below the threshold indicates that the first downlink reference signal cannot be used for the downlink path loss estimation or the uplink spatial transmit beam determination.

3. The method of claim 1, wherein the location server periodically receives the report indicating the signal quality of the first downlink reference signal.

4. A method of wireless communication performed by a user equipment (UE), comprising:
   receiving, from a network node, a configuration to use at least a first downlink reference signal from a neighboring cell to estimate a downlink path loss or determine an uplink spatial transmit beam;
   sending, to the network node, a report indicating a signal quality of the first downlink reference signal; and
   based on the signal quality of the first downlink reference signal being below a threshold, receiving, from the network node, a configuration to use at least a second downlink reference signal from the neighboring cell or a serving cell to estimate the downlink path loss or determine the uplink spatial transmit beam.

5. The method of claim 4, wherein the network node comprises a serving base station of the UE.

6. The method of claim 4, wherein the network node comprises a location server.

7. The method of claim 4, wherein the signal quality of the first downlink reference signal being below the threshold indicates that the first downlink reference signal cannot be used for the downlink path loss estimation or the uplink spatial transmit beam determination.

8. The method of claim 4, wherein the UE periodically sends the report indicating the signal quality of the first downlink reference signal.

* * * * *